United States Patent
Guay et al.

Patent Number: 5,852,818
Date of Patent: Dec. 22, 1998

[54] NON-RECURSIVE METHOD FOR PARAMETER EVALUATION WITHIN AN INFORMATION MANAGEMENT SYSTEM

[75] Inventors: Todd Guay; Gregory Smith; Geoffrey Wilson, all of Nashua; Gaylen Royal, Bedford; Jonathan Riel, Nashua, all of N.H.

[73] Assignee: Oracle Corporation, Redwood Shores, Calif.

[21] Appl. No.: 772,298

[22] Filed: Dec. 23, 1996

[51] Int. Cl.⁶ ........................................................ G06F 17/30
[52] U.S. Cl. ........................... 707/1; 707/2; 707/100; 707/101
[58] Field of Search ................................. 707/1, 101, 2, 707/100

[56] References Cited

U.S. PATENT DOCUMENTS

| | | | |
|---|---|---|---|
| 5,202,981 | 4/1993 | Shackelford | 707/100 |
| 5,446,891 | 8/1995 | Kaplan et al. | 707/2 |
| 5,471,629 | 11/1995 | Risch | 395/800 |
| 5,546,570 | 8/1996 | McPherson, Jr. et al. | 707/2 |
| 5,566,333 | 10/1996 | Olson et al. | 707/2 |
| 5,581,482 | 12/1996 | Wiedenman et al. | 364/551.01 |
| 5,627,760 | 5/1997 | Slutsker et al. | 364/492 |
| 5,659,727 | 8/1997 | Velissaropoulos et al. | 707/2 |
| 5,659,742 | 8/1997 | Beattie et al. | 707/104 |
| 5,664,106 | 9/1997 | Caccavale | 395/200.54 |
| 5,675,788 | 10/1997 | Husick et al. | 707/104 |
| 5,708,590 | 1/1998 | Slutsker et al. | 364/551.01 |
| 5,732,240 | 3/1998 | Caccavale | 395/445 |

*Primary Examiner*—Thomas G. Black
*Assistant Examiner*—Frantz Coby
*Attorney, Agent, or Firm*—Wagner,Murabito&Hao

[57] ABSTRACT

A method for non-recursive data driven parameter evaluation within an information management system (e.g., a relational database management system, RDBMS). Parameters are attributes within an RDBMS system whose value can be modified to influence the manner in which a database environment responds. Depending on the character of the data within a database environment or the hardware resources allocated to the database, the parameter values have a large influence on the performance efficiency of the database. For instance, a parameter value may influence the memory size of certain data storage areas within a database environment and, if set too small, can cause an inefficiently large amount of input/output accesses to occur as data is moved in and out of disk storage. Also, many parameters are data dependent on other parameters. The novel system presents an automated system for evaluating parameters using a non-recursive evaluation process. By using a non-recursive approach, the evaluation process is streamlined in that only one pass yields an optimum parameter evaluation and the results are reproducible. The novel system identifies a set of parameters within an environment to be tuned, eliminates cyclic dependencies, and orders the parameters based on independence, levels of dependence, impact on system performance and common data usage. The present invention is data driven because rules within a respective parameter are then evaluated based on data availability to arrive at a set of parameter value recommendations. In one embodiment instance, tablespace, system environment, and schema parameters can be evaluated within a RDBMS tuning session.

24 Claims, 11 Drawing Sheets

NON-RECURSIVE METHOD FOR PARAMETER EVALUATION WITHIN AN INFORMATION MANAGEMENT SYSTEM

BACKGROUND OF THE INVENTION (1) Field of the Invention

The present invention relates to the field of computer systems used for storage, retrieval, and processing of information. More specifically, the present invention relates to the field of parameter evaluation methods for tuning an information management system, e.g., a relational database management system.

(2) Prior Art

Computer implemented relational database management systems (RDBMS) are well known in the art. Such database systems commonly employ data tables that contain columns and rows containing data. A typical RDBMS, in addition to maintaining the data of a particular database, also maintains a set of statistics regarding the data and also regarding the database environment (e.g., allocated hardware resources) of the RDBMS. These statistics are useful in efficiently accessing, manipulating, and presenting the stored data. Statistics are non-modifiable attributes which in essence represent facts about the RDBMS environment, e.g., the number of rows (cardinality) of a database table, or the amount of system memory allocated for the database to the user (e.g., System Global Area size), or number of processors allocated for the RDBMS environment.

Modifiable attributes or parameters are also present within the RDBMS system. A parameter is a modifiable value that can be changed in order to influence the manner in which a database environment responds and the manner in which database resources are allocated. A parameter contains a set of rules defining the respective manner in which the parameter is to be evaluated and the dataset on which the parameter is dependent, if any. In order to provide an effective RDBMS environment (database environment), the parameters require tuning for a particular database program or "instance." In general, parameters influence the amount and manner in which the following computer resources are used for a given instance: CPU processing; input/output (I/O) resources; memory resources; and contention regarding the number of locks within a system (described further below). It is expected that, by tuning, data flow bottlenecks regarding these database resources can be reduced.

Parameter tuning poses special problems due to the following issues: (1) the level of complexity which exists between the value of a parameter and its overall impact on database performance; and (2) interdependencies between the parameter values. With respect to the former issue, often the definitions of the parameters are complex in terms of the resources that are affected by the values placed within them. Furthermore, the effect on overall database performance based on a specific parameter modification can be unknown, unless the person making the parameter modifications possesses a detailed knowledge of the database system. This former issue makes manual parameter evaluation and modification problematic because the one making the changes or evaluations may not have a sufficient knowledge of the overall database system with which to properly judge or predict the performance impact of the parameter modification.

The latter of the above two issues makes parameter evaluation problematic even for those who possess the requisite knowledge regarding the impact of a parameter change on system performance because interdependencies between parameters makes it difficult to isolate a change in one particular parameter and then properly judge its impact on overall system performance. In effect, one parameter adjustment can lead to a number of unknown or unexpected side effects, requiring additional or subsequent parameter adjustments. It would be advantageous, then, to provide a parameter evaluation method that reduces or eliminates the problems associated with the above issues.

In the past, there have been two general methods for performing parameter evaluation within a database system. The first method is a relatively simple approach whereby a resource bottleneck is identified, e.g., by analyzing database performance statistics, and a single parameter having a large influence on the bottleneck is selected and modified in an effort to reduce the identified bottleneck. System (and database) performance is then monitored for improvement and another parameter is selected and modified if necessary. Parameter dependencies cause a change in one parameter to effect its dependencies, and so on. This cyclic process continues until sufficient system improvement is reached. This prior art parameter evaluation process is problematic because it can be very time consuming (many man hours and many processor hours) in that it involves a large number of recursive steps in an effort to identify and adjust each parameter which can be modified in order to improve system performance. Another disadvantage of this system is that it is very expert intensive requiring highly experienced database personnel to perform and/or supervise because the user needs to know which parameter has the largest impact on each particular identified bottleneck. Also, since the order of parameter modification is not always well defined within this manual approach, the results may not be reproducible for each application, thus reducing the amount of parameter evaluation standardization available within a large database environment. Another disadvantage of the prior art system is that, in some cases, the side effects can offset or even cause aggregate performance loss between two iterations.

A second prior art parameter evaluation method is similar to the above approach in that bottlenecks are identified and influential parameters are adjusted, but the evaluation process recognizes some dependencies between parameters. However, when one parameter is updated in this second approach, each other dependent parameter is updated in a cyclic process that re-examines the initial evaluation. For example, assume a buffer cache size is set to 30 Megabytes and later in the parameter evaluation process it is realized that only 32 Megabytes of System Global Area memory is available, so the buffer cache is set much too large. If the buffer cache is then reduced during the parameter evaluation process, each other dependent parameter (and their dependent parameters, etc.) needs to be altered by the parameter evaluation process accordingly. Unfortunately, similar to the above approach, this second approach is very expert intensive in identifying the proper parameter to modify given a resource bottleneck and is also very time consuming as many iterations are required to obtained a tuned state for the data environment. In addition, this prior art system is very complex because of the requirement that it backtrack over previously made recommendations.

Both of the above prior art systems share common shortcomings in that: (1) the parameter selected first for evaluation is that parameter having the largest impact on the identified bottleneck without careful analysis of parameter-parameter dependencies; and (2) each is recursive, requiring many iterations to achieve a parameter evaluation that is not guaranteed to be optimum.

Accordingly, the present invention provides a method and system for effectively providing parameter evaluation to tune a particular database environment using an approach that does not consume as much time and computing resources, as described above, and is not as expert intensive as described above. Moreover, the present invention provides a method and system for evaluating parameters using an approach that is not recursive.

SUMMARY OF THE INVENTION

A method is described for non-recursive parameter evaluation within an information management system (e.g., a relational database management system, RDBMS). Parameters are attributes within an RDBMS system whose value can be modified by a software procedure to influence the manner in which a database environment responds. Depending on the character of the data within a database environment or the hardware resources allocated to the database, the parameter values have a large influence on the performance efficiency of the database. For instance, a parameter value may influence the memory size of certain data storage areas within a database environment and, if set too small, can cause an inefficiently large amount of input/output accesses to occur as data is moved in and out of disk storage. Also, many parameters are data dependent on other parameters. The present invention presents an automated method for evaluating parameters using a non-recursive data driven evaluation process. By using a non-recursive approach, the evaluation process is streamlined in that the optimal parameter evaluation is reached on the first pass and the results are reproducible. The system of the present invention identifies a set of parameters within an environment to be tuned, eliminates cyclic dependencies, and orders the parameters based on independence, levels of dependence, impact on system performance and common data usage. The present invention is data driven because rules within a respective parameter are evaluated based on their data availability to arrive at a set of parameter value recommendations. In one embodiment, instance, tablespace, system environment, and schema parameters can be evaluated within a RDBMS tuning session.

Specifically, embodiments of the present invention include a method for tuning a database environment used in conjunction with a relational database management system having a processor coupled to a bus and a computer readable memory unit coupled to the bus, the method including the steps of: a) identifying a plurality of parameters among the database environment; b) removing circular dependencies within the parameters; c) ordering the parameters into a non-recursive evaluation sequence, the step c) including the steps of: c1) placing independent parameters first in the non-recursive evaluation sequence and placing dependent parameters following parameters on which the dependent parameters depend; and c2) for a first set of parameters having no dependencies or equal dependencies, order parameters of the first set of parameters based on their impact on system performance and based on their common data usage; d) using a computer implemented process, evaluating the parameters using the non-recursive parameter evaluation sequence to determine a set of recommended values for the plurality of parameters; and e) tuning the database environment by applying the set of recommended values to the parameters and wherein the step c1) includes the step of placing parameters of the plurality of parameters higher in the non-recursive evaluation sequence based on the number of parameters that are data dependent on the parameters.

DETAILED DESCRIPTION OF THE INVENTION

In the following detailed description of the embodiments of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. Section I presents a discussion of the non-recursive data driven parameter evaluation process of the present invention and Section II presents one exemplary application of the present invention.

SECTION I

Notation and Nomenclature

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 1:
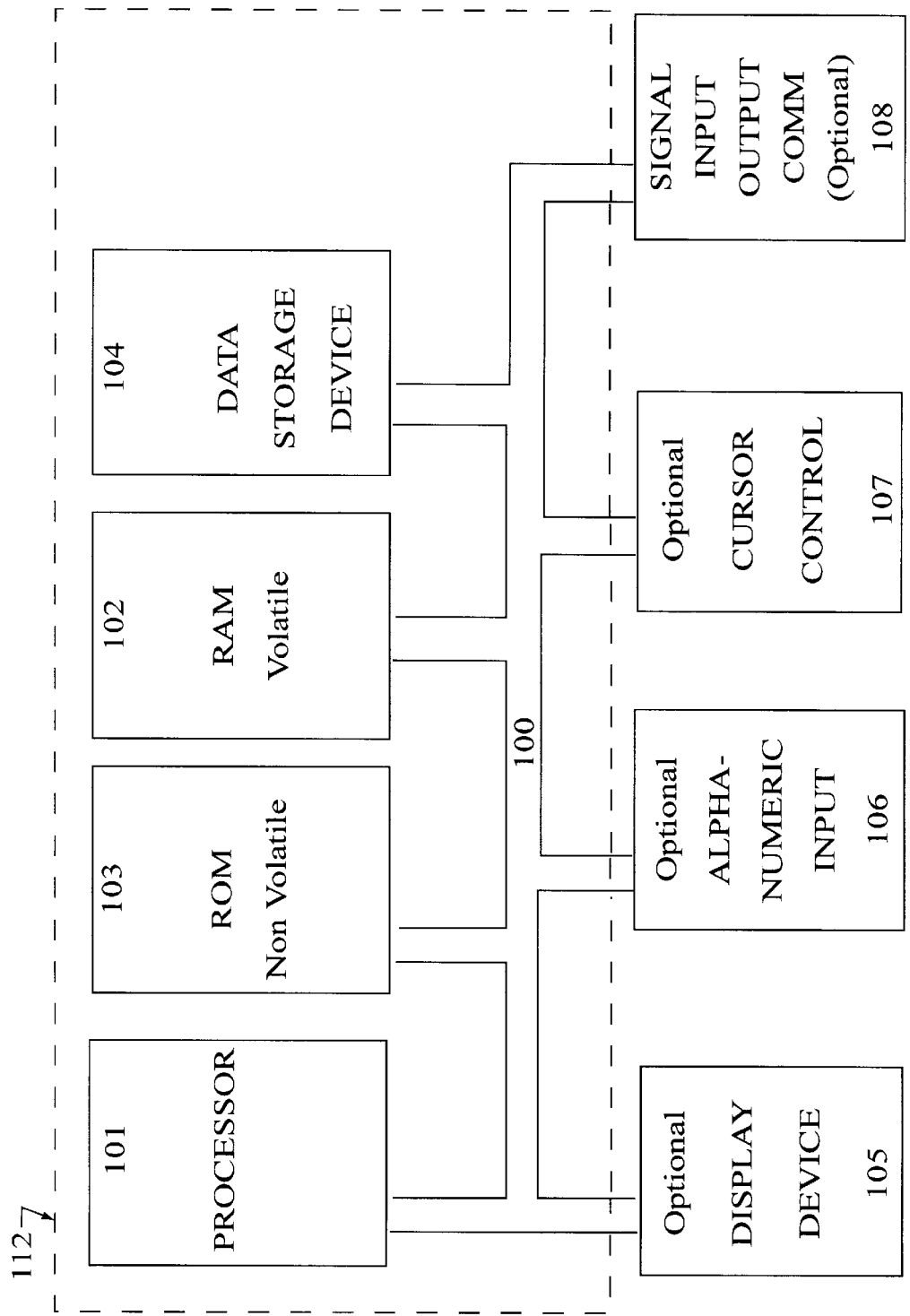
FIG. 1 illustrates an exemplary general purpose digital computer system used in accordance with the present invention data driven non-recursive parameter evaluation process.

Refer to FIG. 1 which illustrates an exemplary computer system 112. Within the following discussions of the present invention, certain processes and steps (e.g., processes 300 and 330) are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an optional alphanumeric input device 106 including alphanumeric and function keys coupled to the bus 100 for communicating information and command selections to the central processor (s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is a DEC Alpha computer system manufactured by Digital Equipment Corporation, but could equally be of a number of various well known and commercially available platforms.

System Hierarchy and Database Objects

Figure 2:
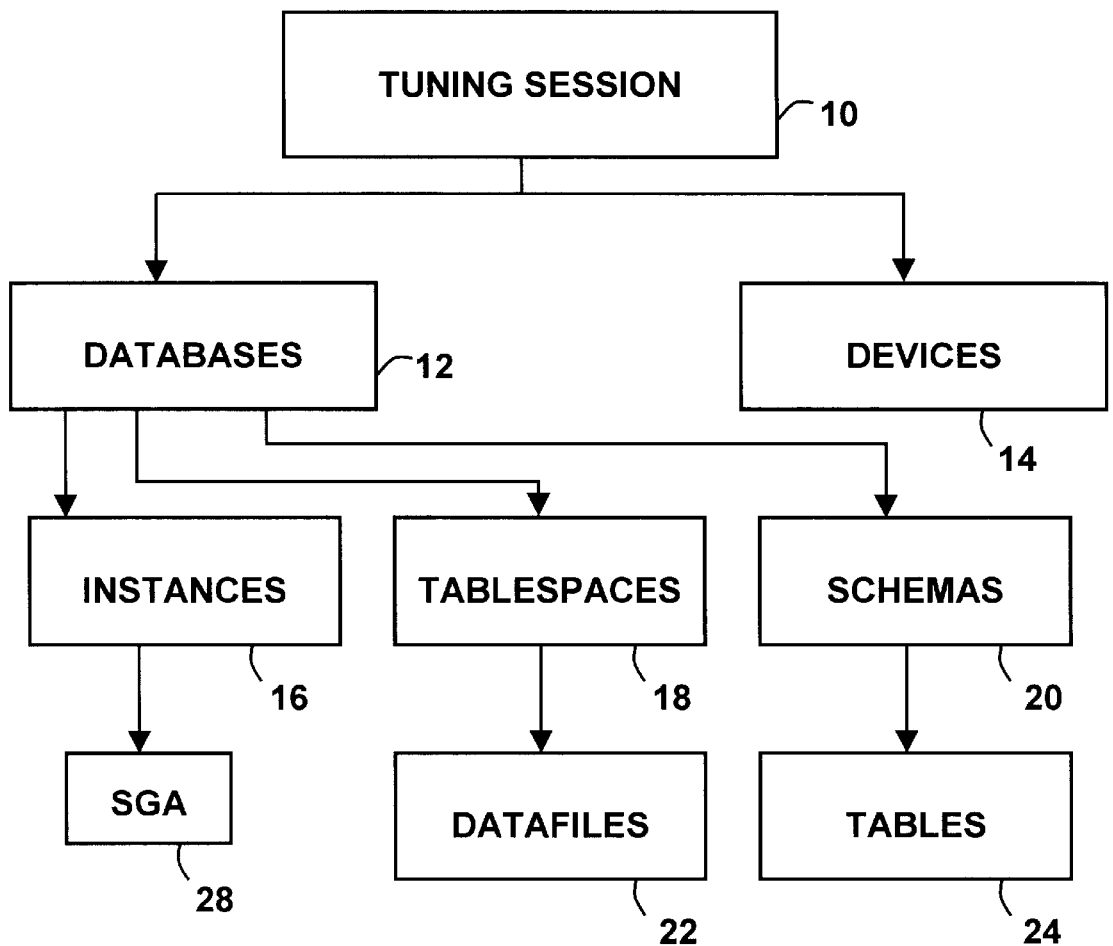
FIG. 2 illustrates a hierarchy of tunable objects within a specific database environment that contains tunable parameters within the present invention.

FIG. 2 illustrates an RDBMS system 5 hierarchy within the scope of the present invention. Under this system, a number of tunable objects are arranged in a parent-child hierarchy. The top of the hierarchy is the tuning session 10 of the present invention. Within the tuning session, the user is able to identify certain parameters for tuning and interact with the tuning process as described to follow. The tuning session 10 produces a set of recommended values to apply to the selected parameters. Under user control, these values can also be applied to the parameters within tuning session 10 to tune the database environment. The tuning session 10 includes a database or databases 12 and devices 14. Devices 14 include the hardware environment on which the database 12 operates. For example, devices 14 generally include: processors (e.g., 101 of system 112), memory unit (e.g., 102 and 103 of system 112), input/output devices (e.g., 104 of system 112) and contention (e.g., memory locks). Locks represent information that temporarily restricts access to certain memory space during certain RDBMS operations for reasons of data integrity. By their nature, locks restrict access to memory resources and can cause contention between multiple processes that need to access the locked memory.

The objects shown in FIG. 2 are specific to the database 12 to which they belong. Examples of objects that are children of a database 12 include the logical schema 20, one ore more instances 16 and tablespaces 18. Other children of database 12 include database sessions, the workload, and configuration. Each child of the database object 12 can have one or more children of its own. For example, table spaces 22 include data files (see above) and schemas 20 also include tables 24. Further, instances 16 can have System Global Area memory (SGAs) 28.

The SGA controls the amount of system memory the database uses to cache data for fast access. Inefficiently tuned shared global areas can account for more than 50 percent performance degradation over a well tuned SGA area. The SGA contains: 1) a buffer cache; 2) a log buffer cache; and 3) a shared pool, which includes a library cache, a dictionary cache and in a multi-threaded server environments, certain user session information. The shared pool contains the library cache of shared statements, the dictionary cache, and if a multi-threaded server is used, session information and the private SQL area for each client process. It is controlled through the parameter, SHARED__POOL__SIZE. The shared pool is used to improve SQL statement performance because parse time can be avoided if the SQL statement is already in the cache and application memory overhead is reduced.

As used above, a schema 20 is a collection of objects. Schema objects are the logical structures that directly refer to the database's data. Schema objects include such structures as tables (see below) 24, views (a custom presentation of data table), sequences, stored procedures, synonyms, indexes, clusters, and database links. Objects in the same schema 20 can have different tablespaces, and a tablespace can hold objects from different schemas. A table 24 is the basic unit of data storage in this exemplary RDBMS system 5. The tables 24 of a database 12 hold all of the user-accessible data. Table data is stored in rows and columns and each table is given a table name and a set of columns (columns are defined by column name, data type and width). A tablespace 18 is a logical storage unit within a database and is used to group related logical structures together. For example, tablespaces 18 commonly group all of an application's objects to simplify certain administrative operations. One or more data files are typically explicitly created for each tablespace 18.

Each running database 12 of FIG. 2 is associated with an instance 16. Every time a database 12 is started on a database server, a memory area called the System Global Area (SGA) 28 is allocated and one or more RDBMS processes are started. The combination of the SGA 28 and the RDBMS processes is called a database instance 16. The memory and the processes of an instance 16 work to efficiently manage the database's data and serve the one or more multiple users (not shown).

The database environment of which the present invention tunes is described with respect to the objects which impact the performance of the database. These objects can be represented as the hierarchy 5 of tunable entities as shown in FIG. 2 where the root of the hierarchy 5 represents the logical session 10 to be tuned, and the children of the tuning session 10 are organized using an "is-part-of" relationship. For example, the database 12 to be tuned is part of the tuning session, tablespaces 18 and instances 16 are part of the database 12, etc. It is appreciated that tuning sessions 10 within the present invention are performed on one object (e.g., instance) at a time.

Attributes

Figure 3:
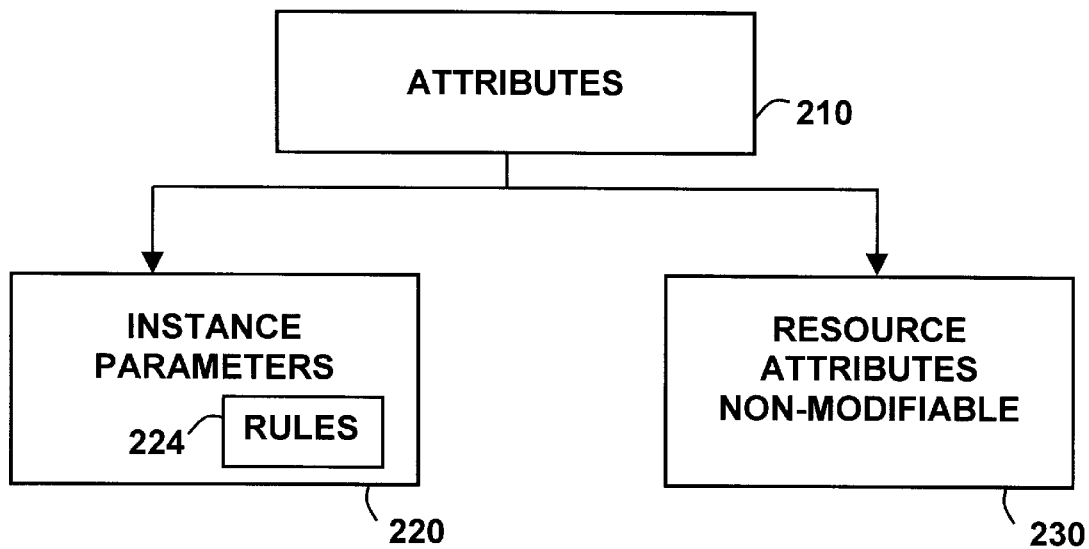
FIG. 3 is a structure diagram of attributes including tunable instance parameter attributes and non-tunable resource attributes used in accordance with the present invention.

Each object of FIG. 2 is composed of one or more attributes. Relationships between objects can be expressed as dependencies between their attributes (e.g., data dependencies). FIG. 3 illustrates that an attribute 210 can be a parameter 220 or a resource attribute 230 (e.g., a database statistic). A parameter 220 is an attribute whose value can be modified by the present invention parameter evaluation process to influence the manner in which the database environment responds. These are database parameters, system parameters, and hardware resource parameters that the present invention can evaluate during a tuning session 10. Parameter decisions impact, or can be impacted by, the resources available to the database environment. In effect, parameters control the environment of the database system; they provide a mechanism, e.g., "pool of knobs," for defining and adjusting the environment of the database system. Parameters control the allocation of the resources (within the database system) that are given to the database system from the computer system's operating system. If the parameters are adjusted such that insufficient resources are provided for the database environment, data flow in the database system can have severe bottlenecks and will not flow smoothly. If the parameters are adjusted to provide excess resource to the database environment, system resources can be wasted on the particular database system.

In general, parameters impact the following four general types of resources: processor (CPU) processing; input/output device usage; memory usage; and contention. With respect to CPU processing, if more than one processor is made available to the database system from the operating system, this could effect a parameter that governs the maximum number of parallel queries that can be performed at one time. With respect to input/output device usage, the fact that a large number of disks are allocated to a database could effect a parameter that governs the maximum number of database records that can be committed or processed at a time. Or the I/O data could effect certain I/O buffer sizes since more I/O processing bandwidth might decrease the required I/O buffer size. With respect to memory usage, the larger the amount of physical memory available, the larger the memory caches which make up the SGA certain other buffers can be made under parameter control. Lastly, contention is caused when database processes lock certain memory while they are using data stored therein, thus preventing other processes from accessing the same data. This is done for data integrity. Certain parameters can effect the number of locks allowed within a database system. More locks generally cause more contention and demand more memory usage. There are parameters which impact the number of locks, the level of locking (row level), as well as the type of lock (protected read, protected write, etc.) where more locks do not necessarily mean more contention.

An example of the non-recursive parameter evaluation process of the present invention is described further below with respect to tuning "instance" parameters. However, it is appreciated that the techniques and steps of the present invention are equally well suited for application with parameters of any object of the hierarchy of FIG. 2. Section II herein presents many exemplary instance parameters. A select group of exemplary instance parameters include: the memory size of the shared pool (for certain database commands); the size of buffer caches; and the number of locks a database has on the database system. It is appreciated that these instance parameters control the database environment that has been allocated to the database system by the computer's operation system.

As shown in FIG. 3, parameter attributes contain evaluation "rules" 224. Rules 224 for a particular parameter contain the set of input data on which the parameter is evaluated and specify the manner or relationship in which the parameter is defined. In many cases, the set of input data can include the value of another parameter, creating a parameter-parameter dependency. Rules are influenced by: 1) the presence or absence of data, e.g., a parameter value or resource attribute value; 2) the condition, e.g., value, of data; and/or 3) the evaluation of another rule. Section II herein presents many exemplary instance parameter rules.

FIG. 3 illustrates that resource attributes 230 also exist. Resource attributes 230 are also referred to as database statistics. A resource attribute, unlike a parameter, is not modifiable during a tuning session of the present invention. A resource attribute is a fact that represents data of an object, e.g., a table has 120 rows, a table has 4 columns, the data in a table has a distinct cardinality of 67, there are 80 maximum number of index segments for the object, etc. The resource attributes can be used as input values in the evaluation of a parameter rule 224. A database system typically logs many database statistics during operation. Although the present invention is well suited for application with any number of database statistics, Table I below illustrates a list of exemplary database statistics.

TABLE 1

| | |
|---|---|
| Parallel Query Message Memory | Total SGA Size |
| Shared Pool Alloc Failure Size | RESERVED List Last Miss |
| Reserved List Max Free | Reserved List Used Count |
| Max Shared Pool Segment Size | AVG Shared Pool Segment Size |
| STDDEV Shared Pool Segment Size | AVG SQL Request Size |
| Concurrent Requests | Concurrent Sessions |
| Max Concurrent Sessions | Max Open Cursors |
| Parallel Query Servers Busy | Max Transaction Log Buffer Size |
| Buffer Cache Hit Ratio | REDO Log Alloc Hit Ratio |
| In MEMORY Sort Ratio | SHARED Pool Alloc Hit Ratio |
| RESERVED List Hit Ratio | PLSQL Cursor Cache Hit Ratio |
| FREE Buffer Waits Ratio | AVG Dirty Buffer Queue Length |

Figure 4:
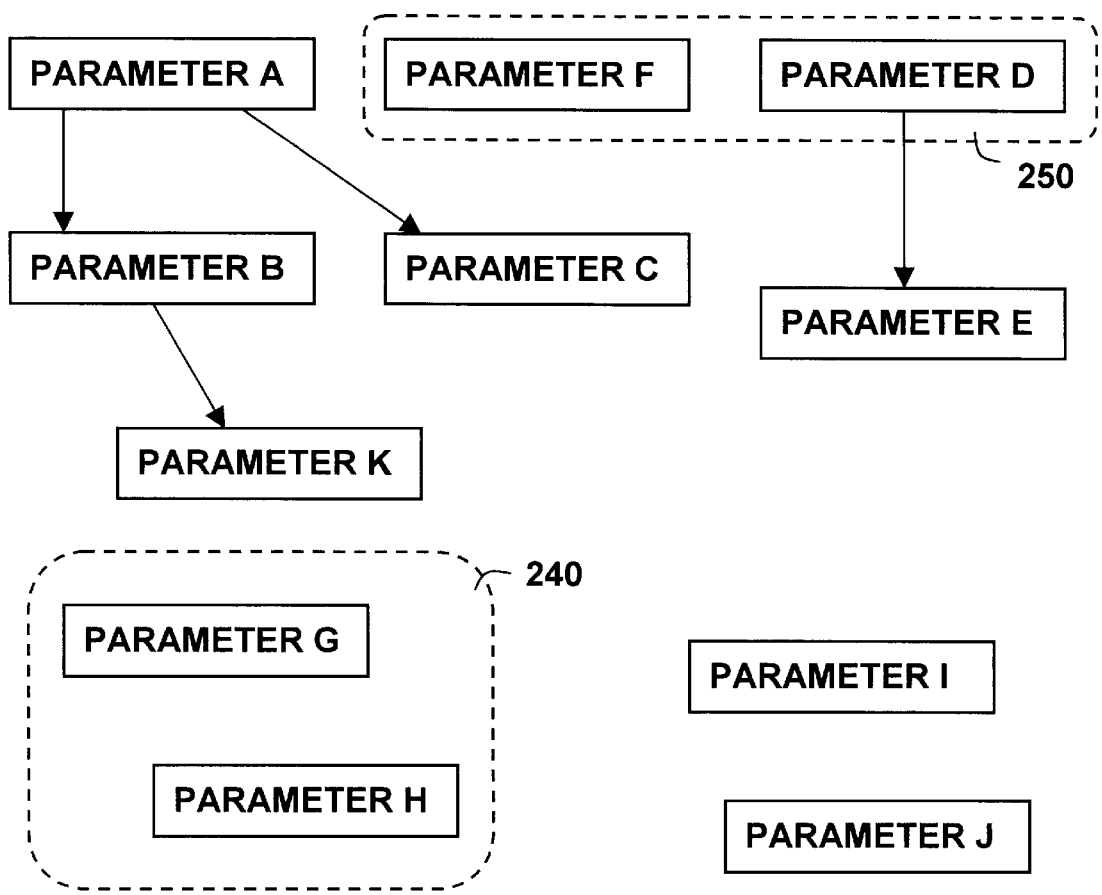
FIG. 4 illustrates a group of exemplary instance parameters in accordance with the present invention and also illustrates dependency and common data usage relationships between the exemplary instance parameters.

FIG. 4 is a diagram illustrating a number of exemplary parameters A-K. Each respective parameter of A-K also contains at least one parameter rule (not shown). Lines between parameters illustrate parameter-parameter dependence. For example, the value of parameter B is dependent on the value of parameter A and the value of parameter K is dependent on the value of parameter B. The value of parameter E is dependent on the value of parameter D. Parameters B, C, K and E are "dependent" parameters because their evaluation depends on the evaluation of another parameter. As shown in the diagram of FIG. 4, at least parameters A, F and D are independent of any other parameter value and therefore are "independent" parameters. Parameters grouped in group 240 share common input data for evaluation. The same is true for parameters grouped in group 250.

The present invention parameter tuning session evaluates the parameters in a manner that does not require recursive paths through the parameters and utilizes a single-pass process to arrive at an optimum evaluation. The parameter evaluations are based on the rules for each parameter and as such the evaluation process is data driven, based on the data of the resource attributes and other parameters.

Parameter dependencies are a major factor in determining the order that the parameters are evaluated within the present invention. For example, the maximum size of the shared buffer pool parameter is dependent on the free memory available on the system. In this case, free memory is a resource upon which the shared buffer pool size parameter depends. If the shared buffer pool size is increased, the total memory requirement of the node increases. This is an example of parameter dependence, since a recommended change is having an impact on some other parameter. If not ordered properly, the number of rules required to support a parameter increases dramatically. The evaluation process of the present invention orders the parameters to produce the optimal evaluation path and avoids having to re-evaluate parameters.

The present invention tuning session recognizes that it is not always beneficial to begin parameter evaluation by starting with the parameter that has the largest impact on a recognized data bottleneck or inefficiency, as does the prior art. In many instances there is a correct manner in which to proceed through the parameters for non-recursive evaluation and this correct manner may or may not start with a parameter having the largest impact on system performance. For instance, assume that parameter K of FIG. 4 has the largest impact on a bottleneck of an exemplary system performance. If parameter K is changed first in the parameter evaluation process and later parameter B and/or parameter A is altered, then implicitly the value of parameter K will be adjusted from its original value to an undesirable or unpredicted result; this condition will then require a recursive path back through the parameter evaluation process until the proper value of K is again reached. Advantageously, the present invention parameter tuning session recognizes that for any set of performance bottlenecks, there is an efficiently performed non-recursive parameter evaluation path that is determined by factors including the absence of cyclic dependencies, parameter data dependence and parameter common data usage and that this evaluation path is not solely governed by the impact of a parameter on reducing a particular recognized data bottleneck or inefficiency.

Exemplary User Interface

As described above, parameters control the database system's allocation and usage of resources that are allocated to the database system from the computer system's operating system. The non-recursive parameter evaluation process of the present invention provides a mechanism for efficiently tuning the values of the parameters, based on certain resource attribute input data and based on other parameter values, to allow efficient processing of the data system.

Figure 5A:
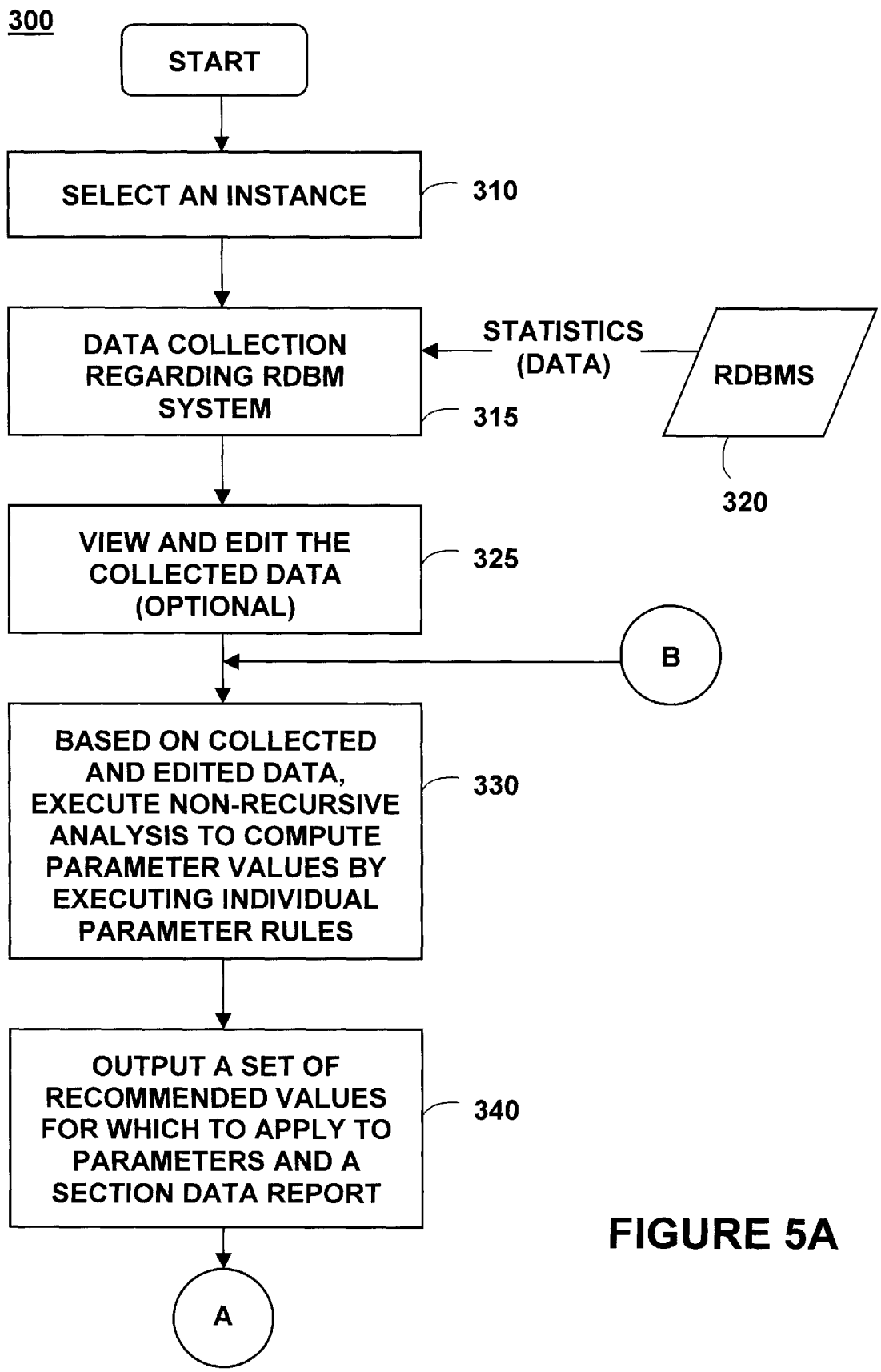
FIG. 5A is a flow diagram illustrating initial steps within the present invention for providing a user interface for selection and data driven non-recursive evaluation of parameters within a RDBMS system.
Figure 5B:
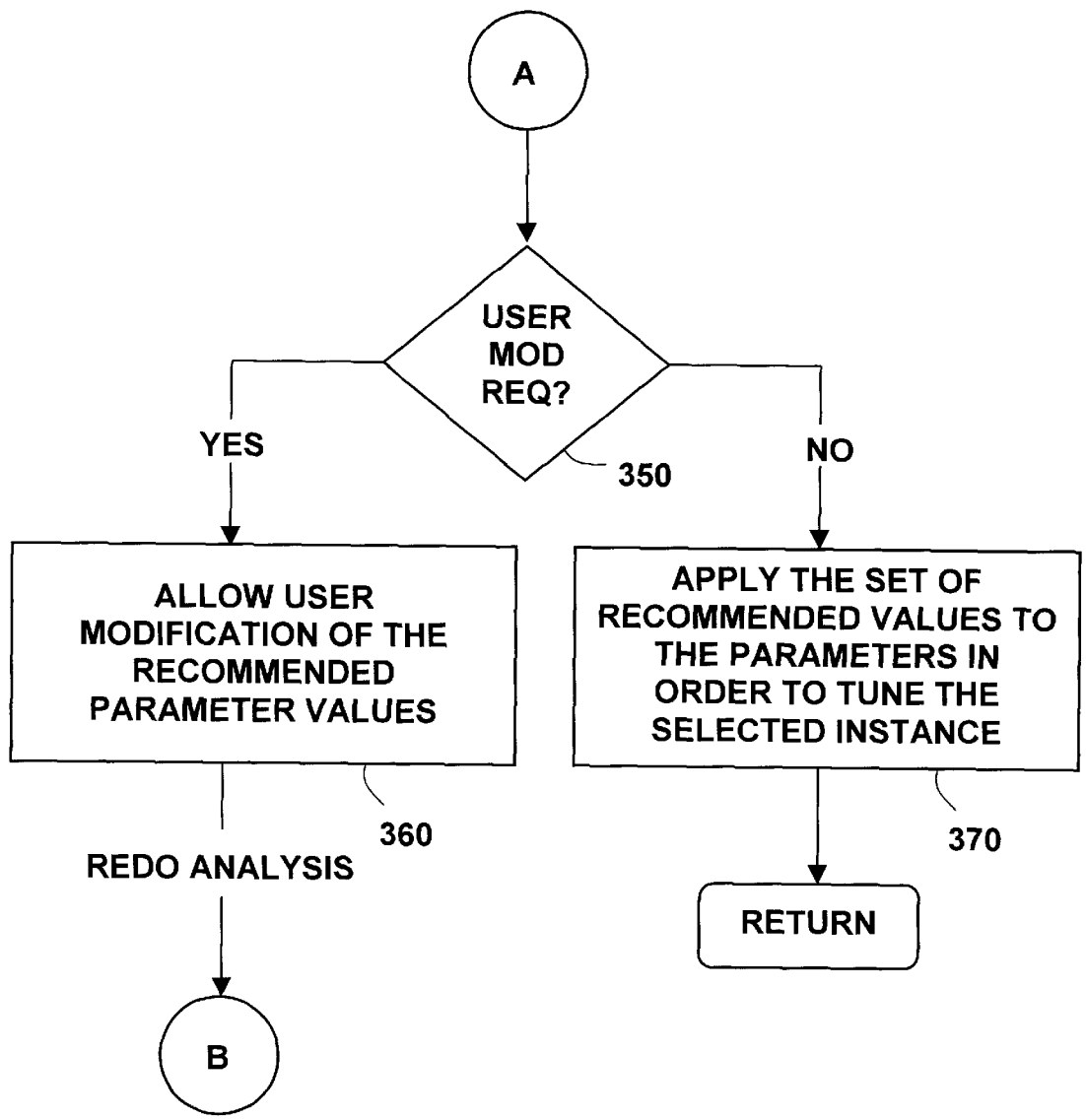
FIG. 5B is a flow diagram illustrating remainder steps within the present invention for providing the user interface for selection and data driven non-recursive evaluation of parameters within a RDBMS system.

FIG. 5A and FIG. 5B illustrate an exemplary user interface process 300 used in conjunction with the present invention's non-recursive parameter evaluation tuning session (process or step 330). It is appreciated that while the present invention's non-recursive parameter evaluation tuning session can be used independently, or, in or with other user interface processes, process 300 provides an exemplary framework in which to explain the details of process 330 of the present invention. It is appreciated that process 300 is implemented as program or instruction code stored within computer readable memory units of system 112 and executed by processor 101.

At step 310 of process 300, the user, or other originator, selects an object for tuning. In this example the object is a database instance. In one embodiment of the present invention, step 330 operates to tune one instance at a time. Once an instance is selected, a group or set of parameters relevant to that instance are determined at step 310. At step 315, system 112 collects, using well known techniques, data regarding the RDBMS system 320 including database statistics, the present values of the instance parameters, and information regarding the hardware resources of system 112 made available to the RDBMS system 320 by system 112's operating system. The database statistics include information regarding certain predefined attributes indicating the performance of system 320. Many of the hardware resources indicated above are shared and include the number of input/output devices available to system 320 (e.g., unit 106), the available amount of memory (e.g., unit 104), and the number of processors available to system 320 (e.g., 101), etc. It is appreciated that database statistics are stored chronologically in the RDBMS; some systems only maintain the lastest "current" snapshot, so they generally do not perform trending.

At optional step 325 of FIG. 5A, the data collected at step 315 is presented on a display screen (e.g., unit 105 of system 112). At step 325, the user, e.g., a database administrator (DBA), is allowed to view and edit the data. It is useful to providing an editing feature at step 325 because this allows the user to perform "what if" processes assuming system 320 has a particular user originated condition. At step 325, the user is allowed to place settings within the parameter rules to alter the parameter's evaluation method. At step 325, the user is able to alter certain information based on which applications or processes are of higher priority over others and based on which types of transactions are running in the majority (e.g., whether they are on-line transaction processing oriented or decision-support based, etc.). Also, at step 325 the user can determine and input the percentage of total memory that a sever has available to it from the perspective of the entire system 112.

At step 330 of FIG. 5A, the data driven non-recursive parameter evaluation process is performed over system 112 based on the collected (and potentially edited) data collected at step 315. Individual parameter values are separately determined based on the respective rules of each parameter. Process 330 is described in more detail below. Process 330 of the present invention generates an optimum set of recommendations which include values determined for each parameter, but not yet implemented in RDBMS system 320. At step 340, this information is presented to the user in a report format, one of which includes a listing of the parameter values recommended by process 330. Several exemplary parameter value recommendations are shown in the parameter definitions of Section II. An analysis report specifies each respective parameter value and the rationale for determining the parameter value. A section data report can also be generated by step 340 which specifies all of the data that was collected in order to generate the analysis report. In the preferred embodiment, the control logic within process 330 that leads to a single-pass optimum parameter evaluation is implemented as a sequence of coded dependencies within the parameter rules.

At step 360 of FIG. 5B, the user is allowed to modify the parameter values within the recommendation before they are applied to the system 320, e.g., the user can accept/reject individual recommendations. However, user modification is not necessary within process 300 or the functionality of step 330; in an alternative embodiment, step 350 is disabled to restrict user modification. If user modifications are requested at step 350, then at step 360, the user can reject certain parameter value recommendations. However, due to parameter-parameter dependencies, if any user rejections are made, then process 330 needs to be performed again as shown in FIG. 5B and the current analysis is then invalid. When performed again, process 330 recomputes all parameters dependent on the user rejections of step 360. In general, this typically requires a complete re-analysis. Subsequent to step 360, step 330 is entered again. However, if at step 350 the user does not require any parameter recommendation rejections, or if user rejections are not allowed, then at step 370 of process 300 the present invention applies the set of recommended parameter values to the selected parameters in order to tune the selected instance of system 320 (the instance being selected at step 310). Process 300 then ends.

Construction of Non-Recursive Instance Parameter Evaluation Step 330

Figure 6A:
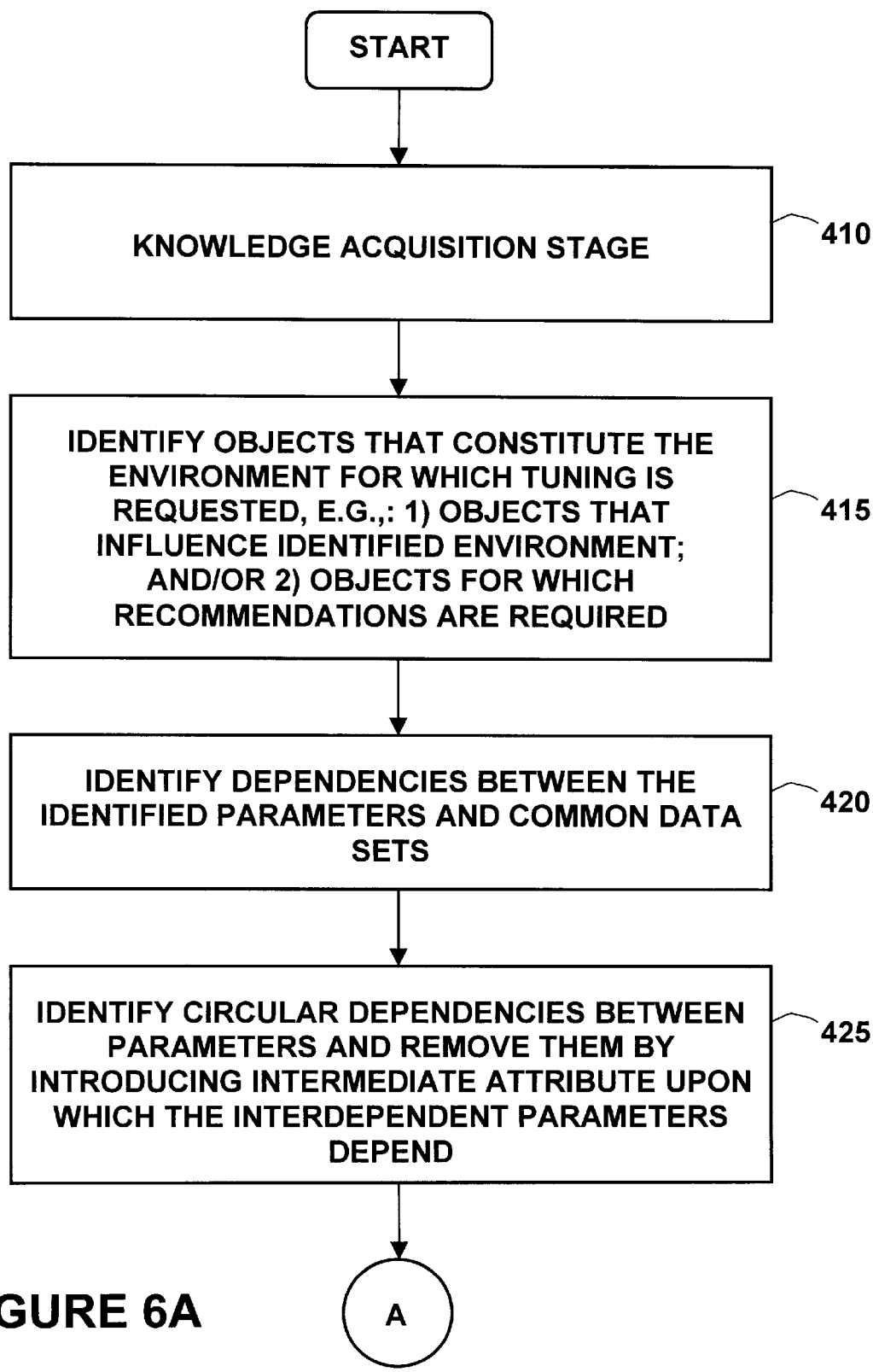
FIG. 6A, FIG. 6B and FIG. 6C are a flow diagram illustrating steps within a process of the present invention for determining a non-recursive evaluation order for a set of determined instance parameters and respective rules.
Figure 6B:
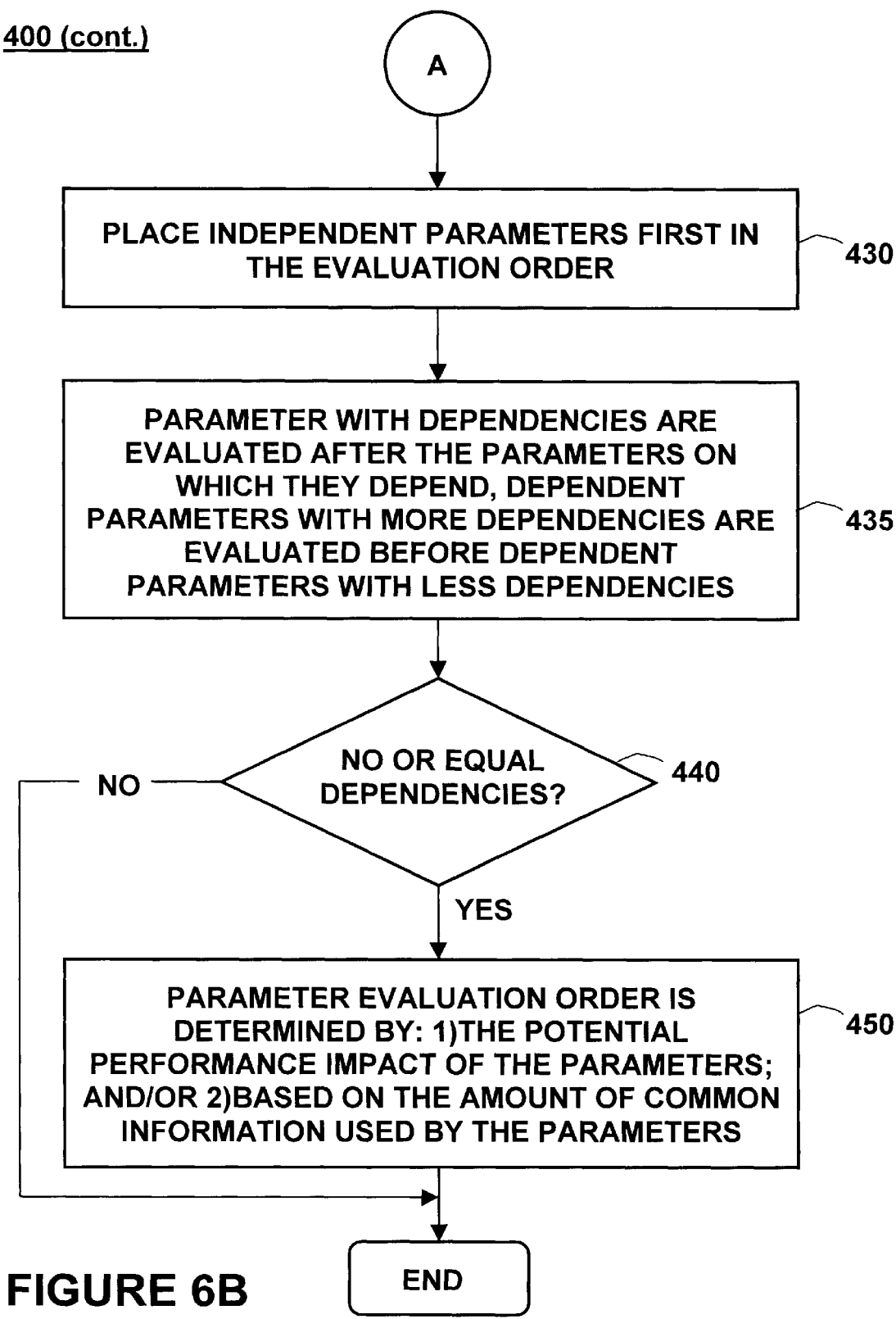
Figure 6C:
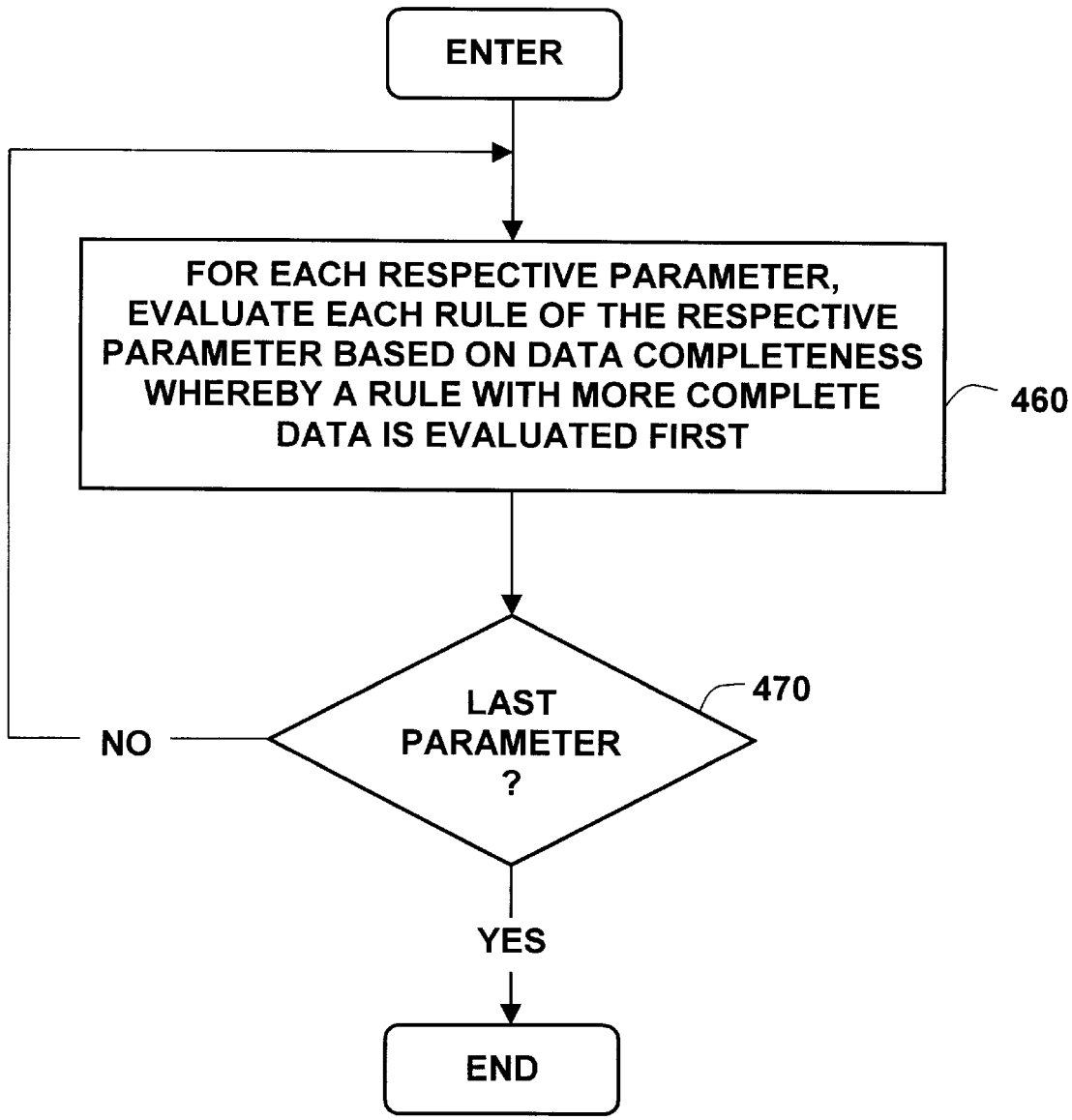

FIG. 6A, FIG. 6B, and FIG. 6C illustrate a process 400 used by the present invention for determining a data driven, non-recursive instance parameter evaluation sequence; the sequence then being capable of evaluation by a computer system (e.g., process 330 of FIG. 5A). Although process 400 is illustrated with respect to instance parameters, process 400 is well suited for evaluation of any other type of parameter. It is appreciated that the particular non-recursive parameter evaluation ordering determined by process 400 can readily be encapsulated (as data and/or control instructions) into the rules of the particular parameters or can be hard coded into the parameters themselves.

At step 410 of FIG. 6A, a knowledge acquisition stage is performed based on a selected system (e.g., RDBMS system 320). At step 410, experts within the field familiar with the selected system indicate a listing of instance parameters and resources that have an impact on the performance and data flow within the selected system. They also indicate which instance parameter values effect other instance parameters values and how hardware resources and other statistics affect the instance parameters. This information is eventually used to construct certain rules 224 (FIG. 3) within each instance parameter 220. In many cases, this information is readily available and/or given to the other processes of the present invention. Information regarding a particular instance parameter's degree of impact on the performance of the database system 320 is also encoded at step 410.

At step 415 of FIG. 6A, the present invention identifies those objects that constitute the environment for which tuning is requested. The instance for which tuning is requested is selected in step 310 (FIG. 5A). At step 415, the identified objects include those that influence the identified environment (e.g., hardware resources, database statistics) and also include the objects (e.g., instance parameters) for which recommendations are required. The list of objects identified in step 415 is generally acquired from the research information acquired by step 410 once a particular instance is selected. At step 415, the present invention obtains a list of objects, e.g., hardware resources, a list of attributes, e.g., database statistics (resource attributes), instance parameters, etc., and a list of instance parameter rules.

At step 420 of FIG. 6A, the present invention identifies those instance parameters from the set of instance parameters identified in step 415 that are data dependent on each other. This is performed by examining the rules for evaluating each instance parameter. An instance parameter having a rule including an input that is from another instance parameter creates the parameter-parameter dependency. For instance, at step 420, the dependencies indicated in the diagram of FIG. 4 are identified and recorded. A parent-child relationship is recorded for each dependency within a multi-level dependency chain with the child being dependent on the parent. More than one child can be dependent on any parent. One child can be dependent on more than one parent, creating a parent-child relationship for each dependency. At step 420, the present invention also identifies those instance parameters whose rules share a large degree of common input data. The degree of common data required to be grouped into a "common data" set (e.g., sets 250 and 240 of FIG. 4) by step 420 is programmable.

At step 425, the present invention identifies any circular dependencies within the instance parameters considered at step 420. Circular dependencies are dependencies which are interdependent. For example, a simple case is when the value for instance parameter X depends on the value for instance parameter Y and the value for instance parameter Y depends on the value for instance parameter X (e.g., X→Y and Y→X). Circular dependencies can be much more complicated also, e.g., X→Y, Y→Z, and Z→X. Circular dependencies in an evaluation order indicate a misrepresentation in the module in the manner in which the dependencies are defined. In a circular dependency, generally, there is a missing intermediate attribute upon which the interdependent instance parameters actually depend. At step 425, the present invention locates these intermediate attributes to remove the circular dependency. New dependency relationships avoiding the circular dependencies are then constructed by the present invention involving the intermediate attribute. This is done for each parameter interdependency. For instance, in the simple case (e.g., X→Y and Y→X), there is an intermediate attribute, Z, located by the present invention such that Z→X and Z→Y. In the more complex case, X→Y, Y→Z, and Z→X, there is an attribute U located by the present invention such that U→X, U→Z, X→Y, Y→Z. Step 425 also determines if the dependencies given within a circular dependency chain are not correct. For instance, at step 425, it can be determined that X→Y and Y→X are not the correct dependencies for instance parameters X and Y. In one embodiment, step 425 is performed with the aid of expert knowledge familiar with the details of the parameters identified at step 415.

An example of the process performed by step 425 is given below. First, assume the instance parameter, Shared pool allocation hit ratio, is dependent on the Shared pool size instance parameter. A rule is defined such that as the allocation hit ratio falls below a certain threshold, an increase in the share pool size is caused. Second, the instance parameter, Pool fragmentation, is dependent on the instance parameter, Shared pool reserved size. A rule is defined such that increasing the reserved pool resolves pool fragmentation problems. Third, the instance parameter, Shared pool size, is dependent on the instance parameter, Shared pool reserved size. A rule is given such that the reserved size can be no greater than one half the shared pool size. Last, the instance parameter, Shared pool reserved size, is dependent on the Shared pool size instance parameter. A rule is given such that the reserved pool is taken from the shared pool, so increasing the reserved pool requires a corresponding increase to the shared pool.

The above example illustrates a circular dependency between the parameters Shared pool size and Shared pool reserved size, since the values of these instance parameters depend upon one another in an interdependent manner. The problem is resolved by the present invention at step 425 by introducing an intermediate attribute, Pool fragmentation allocation, which contains the amount of pool space required to correct the pool fragmentation problem and adjust the dependencies. The new instance parameter dependency relationships formulated by step 425 of the present invention become:

Pool fragmentation→Pool fragmentation allocation;
Pool fragmentation allocation→Shared pool reserved size;
Pool fragmentation allocation→Shared pool size; and
Shared pool size→Shared pool reserved size.

As shown above the circular dependency is broken by the present invention. An exemplary instance parameter evaluation order for these four values is: 1) Pool fragmentation; 2) Pool fragmentation allocation; 3) Shared pool size; and 4) Shared pool reserved size.

It is appreciated that the introduced intermediate attribute (e.g., Pool fragmentation allocation) does not need to be an instance parameter that is to be evaluated. It can merely be an intermediate dependency introduced to break the identified circular dependency.

The construction of the non-recursive instance parameter evaluation order continues at step 430 of FIG. 6B. The independent instance parameters, e.g., those having no data dependencies on other instance parameters, are placed first in the. evaluation order. Within the evaluation order of the present invention, a given instance parameter cannot be evaluated before evaluation of an instance parameter upon which the given instance parameter's value is dependent. The independent instance parameters of the exemplary diagram of FIG. 4 include instance parameters: A, F, D, G, H, I and J. Independent instance parameters are ordered among themselves such that those instance parameters having more dependencies (e.g., having more other parameters dependent on them) are evaluated first before those with fewer dependencies. For instance, instance parameter A and instance parameter D of FIG. 4 both are independent. However, instance parameter A has three instance parameters (instance parameter B, C and K) that are dependent on it and instance parameter D has only one instance parameter dependent (instance parameter E) on it. While the independent instance parameters are evaluated first within the present invention, as between instance parameters D and A, instance parameter A is evaluated first in evaluation order, ahead of instance parameter D.

At step 435 of FIG. 6B, the present invention orders those instance parameters with dependencies next. Dependent instance parameters are always ordered such they follow subsequent to the evaluation of instance parameters on which they depend. As between dependent instance parameters ordered as described above, those dependent instance parameter having more dependencies (e.g., more instance parameters depending on them) are evaluated in advance of other dependent instance parameters having less dependencies.

Instance parameters having no dependencies or an equal number of dependencies (between two or more instance parameters) are identified at step 440 and evaluated at step 450. At step 450 of FIG. 6B, instance parameters meeting the above condition are evaluated based on: 1) the degree of potential performance impact of the instance parameter on the database system 320 and 2) based on the amount of common information used during the evaluation. Information regarding a particular instance parameter's degree of impact on the performance of the database system 320 is encoded at step 410. This information is used at step 450 to break instance parameter evaluation ordering ties. Those instance parameters having otherwise equal evaluation orderings at step 450 are ordered such that the instance parameter having the largest impact on system performance is evaluated earlier over those instance parameters having a relatively lower impact on system performance. For instance, between instance parameters I and J, if instance parameter J has a relatively larger impact on system performance over instance parameter I, instance parameter J will be evaluated before instance parameter I.

At the completion of the above evaluation orderings based on system performance impact, as for instance parameters having otherwise equal evaluation orderings, the present invention at step 450 orders the evaluation of these instance parameters based on their common data usage or based on their impact on a common area. For example, those independent instance parameters that share a large degree of common input information are evaluated in close proximity to one another in the non-recursive evaluation order. These instance parameters, for instance, might use the same input statistics or they might all impact the size of the SGA area. For example, instance parameter F and instance parameter I have no dependencies. However, instance parameter F shares common input information with instance parameter D. Therefore, instance parameter F is evaluated in close proximity to instance parameter D. Since instance parameter D is evaluated before instance parameter I (e.g., for reasons of degree of dependence), instance parameter F is also evaluated before instance parameter 1. The same is true for instance parameter J which is evaluated after instance parameter F. Also, instance parameter G and instance parameter H are evaluated in close proximity with each other. At the completion of step 450, the identified instance parameters of step 415 are given a particular evaluation order within the present invention. It is appreciated that the instance parameter evaluation order determined by process 400 is the instance parameter evaluation order used in the non-recursive instance parameter evaluation process 330.

It is efficient to group certain parameters as described above based on common data usage or common data impact because this evaluation ordering reduces data I/O access time and data gathering and sorting complexity for the group. Also, with respect to other downstream parameters that are dependent on the group's evaluation, these downstream parameters will all be able to be efficiently evaluated at about the same predictable time once the group's evaluation is complete.

Figure 7:
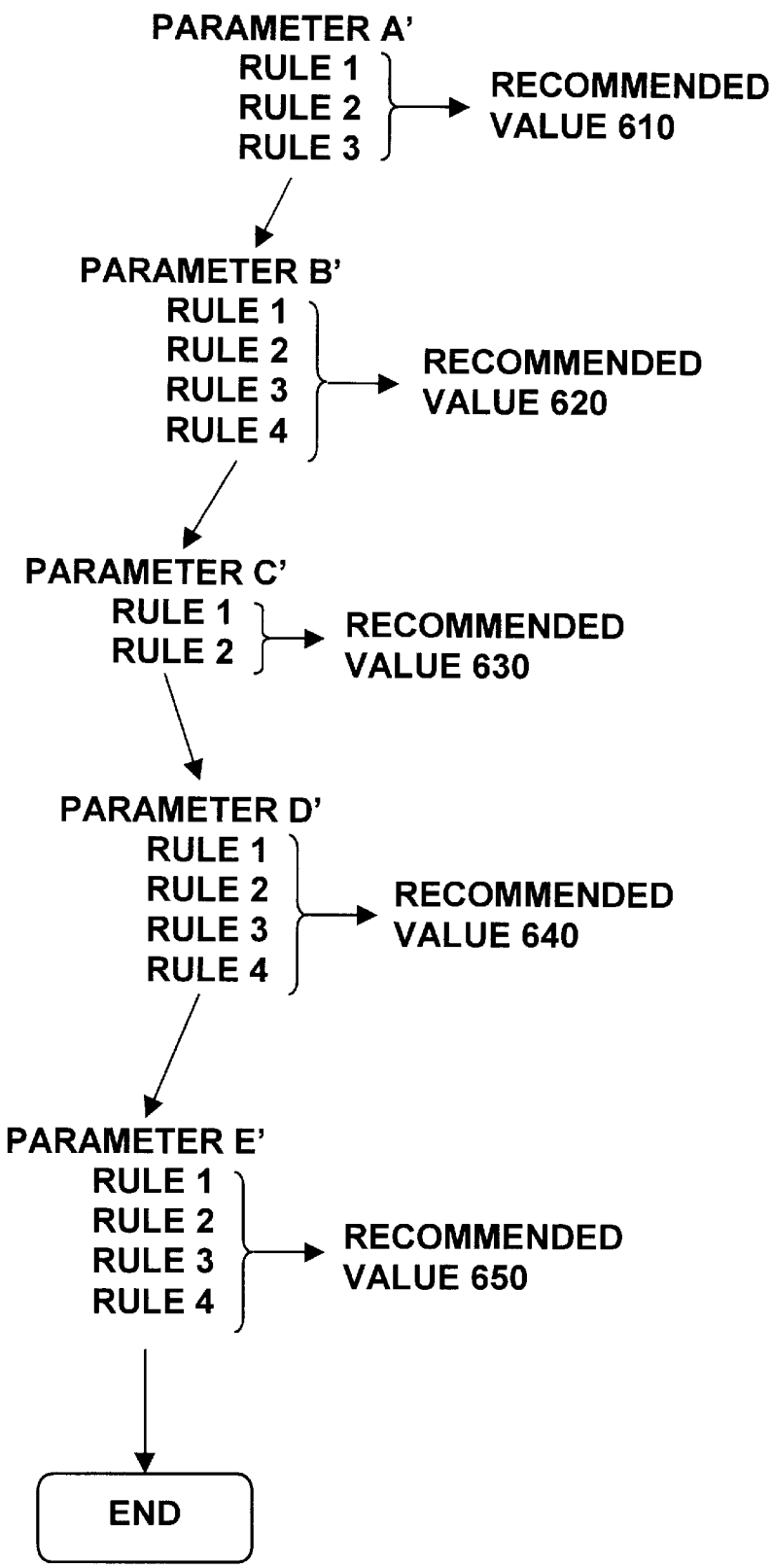
FIG. 7 illustrates an exemplary process of the present invention for non-recursive data driven instance parameter evaluation.

FIG. 7 illustrates an exemplary non-recursive instance parameter evaluation order ("evaluation path") of five exemplary instance parameters within process 330. As shown, the instance parameter ordering from first to last is: instance parameter A', instance parameter B', instance parameter C', instance parameter D', and instance parameter E'. Also shown in FIG. 7 are the rules associated with each instance parameter described above. The instance parameter ordering as shown in FIG. 7 is determined based on the ordering outlined from the steps of process 400. For each instance parameter evaluation, as described above, the particular evaluation ordering of the instance parameter's rules is governed by steps described below. At the completion of the evaluation of the rules of each instance parameter evaluation, an instance parameter recommended value is generated. For example, instance parameter A' evaluation generates recommended value 610, instance parameter B' evaluation generates recommended value 620, . . . , and instance parameter E' evaluation generates recommended value 650. As also clearly shown in FIG. 7, the instance parameter evaluation ordering is non-recursive through the entirety of process 330. It is appreciated that the parameter evaluation order of FIG. 7 is non-recursive using a single path through the rules, e.g., parameters evaluated higher in the evaluation path are not data dependent on parameter values determined lower in the evaluation path.

The general non-recursive instance parameter evaluation order of the present invention is determined as described with respect to priority ordering rules of process 400 above. However, during the non-recursive instance parameter evaluation process 330, the evaluation order in which the particular rules within a respective instance parameter are evaluated are data driven. FIG. 6C illustrates a process 455, implemented as memory resident program code executed over processor 101 of system 112, that operates during the instance parameter evaluation process 330 of the present invention for each instance parameter to be evaluated. At step 460, for each instance parameter, the evaluation order of the rules within that instance parameter is determined based on the existence (e.g., the availability) of the rule's input data such that rules with a complete and valid set of input data are evaluated before rules with partial data availability. This ensures that within the present invention, the most specific rule for an instance parameter is evaluated before the evaluation of less specific rules. Rule processing within a parameter stops when the conditions for a rule have been satisfied. As shown by step 470, this determination is made for the rules of each instance parameter specified in step 415 (FIG. 6A).

Figure 8:
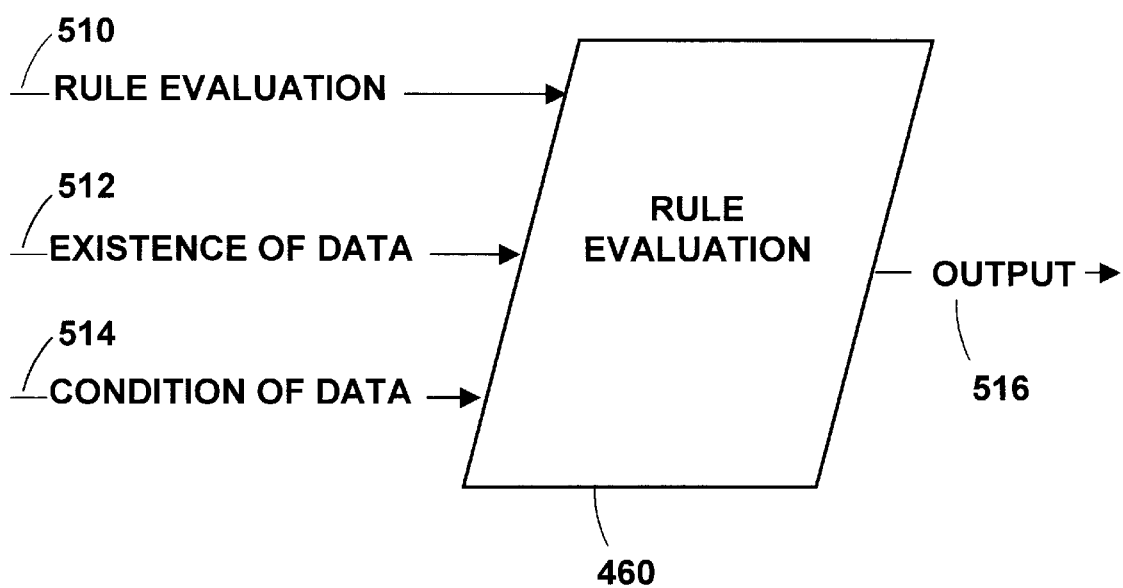
FIG. 8 is a block diagram illustrating dependencies pertinent for rule evaluation within an exemplary parameter in accordance with the present invention.

In view of the above, the evaluation order of the parameter rules is determined by the existence or availability of certain data and is ultimately determined at run time of process 330. For this reason, process 330 is referred to herein as being "data driven." As shown in FIG. 8, it is appreciated that the evaluation ordering of rules 460 within a respective parameter can be data dependent in the following ways: 1) a rule 460 can be dependent upon the evaluation of other rules of the same respective parameter or can be dependent on the evaluation of data from a rule of another parameter, dataflow 510; 2) a rule 460 can be dependent upon the existence or nonexistence of data, dataflow 512; and/or 3) a rule 460 can be dependent upon the value or condition of certain data, dataflow 514. Once it is determined that the conditions specified on the left hand side of the rule have been satisfied, the action portion of the rule is applied by system 112 to determine the new parameter value 516, which is stored in memory.

In the case of a rule dependency, if the dependency is not met, the rule can become invalid (e.g., never applied). With respect to a rule dependency, during the period for which one or more conditions specified for a rule are not satisfied (e.g., they are conditional upon another rule), the action portion of this rule will not be applied. A rule can also become invalid if the data range for a particular rule is never realized. In this case, it could be a proper result that the rule is never evaluated.

The following presents one example of the computer implemented data driven non-recursive parameter evaluation process 330 of the present invention. In the example, five exemplary parameters are given. The Sort_Area_Size parameter dependent on the Sort_Direct_Writes parameter setting because the size of the sort area can be reduced if direct writes are enabled. The parameter Sort_Area_Retained_Size dependent on Sort_Area_Size because the maximum retained size cannot be greater than one half of the total size of the sort area. The parameters Sort_Write_Buffers and Sort_Write_Size are only relevant when Sort_Direct_Writes are enabled. Therefore, these two parameters are both dependent on the Sort_Direct_Writes parameter. In addition, the DB_Block_Buffers parameter is dependent on Sort_Direct_Writes, because direct writes avoid space utilization within the buffer cache, so the total size of the buffer cache can be reduced.

Using the dependencies shown in the example above, process 400 outputs the following non-recursive parameter evaluation order used by computer implemented process 330 of the present invention:

1) Sort_Direct_Write (4 dependencies found);
2) Sort_Write_Buffer_Size, Sort_Write_Buffers (1 dependency each above);
3) Sort_Area_Size (1 dependency above);
4) Sort_Area_Retained Size (shares common information with Sort_Area_Size); and
5) DB_Block_Buffers.

It is appreciated that in addition to the non-recursive data driven parameter evaluation process 330 of the present invention being efficient by eliminating recursive parameter analysis, process 330 also leads to an increase in the consistency of parameter results given a same set of input data with respect to the prior art. The prior art recursive parameter evaluation procedures generally yield varying results given the same input data sample because each pass through the parameter evaluation process is different as different recursive paths are taken by the prior art system. Although each pass iteratively attempts to arrive at an optimum parameter evaluation, the prior art yields multiple different values for each iterative pass, partly because the prior art systems focus on performance impact priority rather than parameter dependence.

Conversely, the present invention provides one non-recursive path through the parameter evaluations using the most optimum evaluation strategy on the first pass. Therefore, optimum parameter recommendations are made after the first pass effectively eliminating the prior art's need to undo previously made recommendations that do not satisfy the requirements evaluated further along in the tuning process. In this way, the present invention: 1) efficiently and effectively arrives at the optimum parameter setting using a time savings non-recursive process; and 2) generates this same result consistently and predictably for the same input sample.

SECTION II

Exemplary Parameter Evaluation Order

Although the present invention is well suited for application with a number of general database parameters, Section II herein presents an example set of parameters and their associated rule definitions. Table II below illustrates an exemplary parameter evaluation order (in a sequential list) performed by one embodiment of process 330 in accordance with the present invention. It is appreciated that the parameters of Table II are described in more detail below. Further, the parameters of Table II represent the 20 most influential parameters evaluated within one exemplary embodiment of

Table II

Compatible | Parallel Max Servers | Parallel Min Servers | Sort Direct Writes | Sort Write Buffer Size | Sort Write Buffers | Sort Area Size | Sort Area Retained Size | Db Block Buffers | Shared Pool Size | Shared Pool Reserved Minimum Allocation | Shared Pool Reserved Size | Log Buffer Size | Open Cursors | Multi-Block Read Count | Simultaneous Writes | Checkpoint Processes | Log Checkpoint Interval | Log Checkpoint Timeout | Database Writers

Exemplary Recommendation Report

The following is an exemplary recommendation report generated by process 330 of the present invention for a sample instance and in accordance with the exemplary parameter evaluation order shown above:

Process 330 has evaluated instance parameters for the sample instance:
  Increase compatible for the sample instance from ver 1 to ver 2.
  Decrease parallel_max_servers to 0 servers for the sample instance.
  Increase log_buffer to 32768 bytes for the sample instance.
  Increase open_cursors to 64 cursors for the sample instance.

Exemplary Parameters

Although the present invention is well suited for application with a number of different system parameters, a group of exemplary parameters with descriptions, associated parameter rules, their relevant data, and user rule settings are presented below. Some exemplary parameters also contain a sample recommendation report generated from process 330. The below listed exemplary parameters track those parameters listed in the exemplary parameter evaluation order shown above.

Compatible Parameter

The compatible instance parameter causes the engine to respond as though the specified earlier version of an RDBMS system is installed. This allows the DBA to transition from an earlier version of an RDBMS system more slowly, or to fall back to an earlier database behavior if there are unexpected problems after an upgrade. This parameter restricts the use of certain performance features when compatible is less than the current database version.
Rule:
  The compatible parameter should be set to the current server version in order for the full benefit of all performance features to be utilized. When compatible is less than the current server version, the number of options that are available to process 330 during the optimization process can be reduced. For example, direct read for table scans and sorts was introduced in one version. If compatible is less than this version then all reads go through the buffer cache. This can cause unnecessary overhead and contention for cache resources. The temporary tablespace capability is another example of a performance feature which is impacted by the compatible parameter setting.
  (Sample recommendation) Process 330 discovered that the default value for the compatible parameter (e.g., version 1) is being used. It is better to specify a value for compatible in the initialization file. Process 330 recommends increasing the compatible instance parameter for the sample instance from:
  Version 1→Version 2
  Implementing this recommendation will allow the database to take full advantage of certain performance features that have been introduced since the current setting.
Relevant Data:
  Compatible setting: version 1
  Default compatible used: yes
  an RDBMS Server Release: version 2
User Rule Settings:
  Default compatible value: version 1
Multi-Threaded Server Option
  The multi-threaded server configuration has a major impact on how memory is utilized within the SGA. Process 330 takes this into account during the evaluation. (Sample Recommendation) This instance is currently configured as a dedicated server.
Parallel Query Parameter Evaluation
  This section contains process 330's evaluation of the instance parameters which impact parallel query processing.
Maximum Parallel Query Servers
  The parallel_max_servers instance parameter determines the maximum number of parallel query servers for the instance. An RDBMS system will increase the number of query servers as demand requires from the number created at instance startup up to this value. The same value should be used for all instances in a parallel server environment. Proper setting of the parallel_max_servers parameter ensures that the number of query servers in use will not cause a memory resource shortage during periods of peak database use.
Rule:
  If parallel_max_servers is set too low, some queries may not have a query server available to them during query processing. Setting parallel_max_servers too high leads to memory resource shortages during peak periods, which can degrade performance. When the parallel server option is not installed, the parallel_max_servers parameter setting should be 0.
  (Sample recommendation) Process 330 recommends decreasing the parallel_max_servers instance parameter from:
  5 servers→0 servers
Relevant Data:
  Parallel max servers: 5 servers
  Parallel query option installed: no
User Rule Settings:
  Evaluate with parallel query: Unknown Minimum Parallel Query Servers
  The parallel_min_servers instance parameter specifies the minimum number of parallel query servers for the instance. An RDBMS system creates the number of query servers specified by this parameter when the instance is started. Optimizing parallel query processing requires tuning of both instance parameters and the structure of the database. The database should be partitioned so that parallel query processing does not result in I/O bottlenecks. In general, if all the database files reside on the same disk, the user will realize less of a benefit from utilizing the parallel query technology than if the data is partitioned across multiple devices. The degree of parallelism should be specified during table and index creation to achieve a higher degree of granularity over the number of query servers used to process a query in parallel.

Rule:

When the parallel_min_servers instance parameter is not large enough, additional processing will take place when additional query servers are needed. This wastes system resources and negatively impacts query response times. Too large a value for the parallel_min_servers instance parameter will cause inactive query server processes to remain on the system. This wastes system resources such as memory.

Relevant Data:

Current parameter setting: 0 servers

Parallel query option installed: no

Available physical memory: 102.40 Mb

Percent of total memory: 80.00 percent

Avg database wide query servers busy: Unknown

Avg query servers busy: Unknown

Processor count: 1

Parallel ready table percentage: 0.00 percent

Avg degree of parallelism: 1.00

Avg CPU utilization: Unknown

Busy server stat sample count: 0 samples

User Rule Settings:

Evaluate with parallel query: Unknown

Maximum servers prestarted: 256 servers

Workload Class: oltp

Sensitivity: 0.90

CPU utilization threshold: 45 percent

Samples for statistical significance: 100 samples

Sort Parameter Evaluation

Process 330 has evaluated the instance parameters which impact sort processing.

Sort Direct Write

The sort_direct_writes instance parameter controls whether sort data will bypass the buffer cache during disk I/O write operations. When this parameter is enabled, a separate sort direct write buffer cache is used to write the results directly to the temporary segments on disk. When the sort direct write mechanism is enabled, an RDBMS system uses the sort direct write buffer cache to write intermediate sort results to disk.

Rule:

If the sort direct write buffer cache is too small, additional I/O will be required to complete the intermediate sort writes. Too large a sort write buffer will waste memory. Additional temporary segment space may be required when sort direct writes are enabled. The sort allocation mechanism allocates temporary space using fixed size chunks which are based upon the sort_write_buffer_size instance parameter. Since the values for this parameter are typically an order of magnitude larger than the db_block_size allocations used when sort direct writes are disabled, unused temporary space in the final segment can increase the overall space requirements.

Relevant Data:

Sort direct writes setting: FALSE

Avg memory utilization: Unknown an RDBMS systemserver Release: version 2

Parallel query option installed: no

Workload Class: oltp

Weighted in memory sort ratio: Unknown

User Rule Settings:

High memory threshold: 90.00 percent

In memory sort threshold: 90.00 percent

Sort Write Buffer Size

The sort_write_buffer_size instance parameter specifies the size of a sort direct write buffer when sort_direct_write is set to TRUE. It is specified in bytes, and ranges between 32 to 64 Kb.

Rule:

This parameter is relevant only when sort_direct_writes is TRUE.

Relevant Data:

Sort write buffer size setting: 32768 bytes

Sort direct writes: FALSE

SORT WRITE BUFFERS

The sort_write_buffers instance parameter specifies the total number of sort direct write buffers for each user process when sort_direct_writes is TRUE. Valid values for this parameter range from 2 to 8 buffers.

Rule:

The size of the sort direct write buffer cache is determined by (sort_write_buffer_size * sort_write_buffers). When the sort_direct_writes instance parameter is set to false, the sort direct write buffer cache is not allocated. In an RDBMS, the sort_direct_writes instance parameter may be set to auto. This means that the sort direct write buffer cache will be automatically sized.

Rule:

This parameter is only relevant when the sort_direct_writes instance parameter is TRUE. No evaluation for this parameter was performed.

Relevant Data:

Sort write buffers: 2 buffers

Sort direct writes: FALSE

Sort Area Size

The sort_area_size instance parameter determines the size, in bytes, of Program Global Area memory that is available to a user process during sort operations. It is allocated on a per user basis from available memory.

Rule:

Sort memory is not allocated from any of the caches in the SGA, unless MTS is enabled. If more space is required to complete the sort than will fit in the memory provided, temporary segments are used to hold the intermediate sort runs.

An RDBMS system uses the amount of memory specified by sort_area_size during sort processing. Once all of the information has been sorted, and the first fetch has completed, if the retained size is less than the sort area size, an RDBMS system merges all of the sort runs into a single run, and sort memory is reduced to the retained size. When the sort_area_size is set too low, extra sort runs will be required during the sort operation. This increases processor and I/O resource consumption, as well as wasting temporary segment space.

Setting sort_area_size too large will waste memory. In extreme cases, large sort_area_size values will consume all available operating system memory and cause high page faulting or process swapping in the operating system.

(Sample recommendation) Process 330 has completed its evaluation of the sort_area_size instance parameter. No changes are recommended for this parameter on the sample instance.

Relevant Data:

Sort area size setting: 262144 bytes

Total physical memory: Unknown

Available physical memory: 102.40 Mb

Available memory size rating: medium

Avg concurrent sessions: 4.00 sessions (1 samples)

Concurrent session rating: small
Sort area configuration: medium
Parallel query option installed: no
User Rule Settings:
Maximum sort area size: Unknown
Minimum sort area size: 65536 bytes
Workload Class: oltp
In memory sort threshold: 100.00 percent
Sort Area Retained Size The sort_area_retained_size instance parameter determines the size, in bytes, to which the sort area memory will be reduced after the final sort run has completed. The retained size controls the size of the read buffer which is used to maintain a portion of the sorted information in memory.
Rule:

If a single process needs to perform multiple, concurrent sorts, each is given a memory allocation of sort_area_retained_size. When the retained size is set too high, memory is wasted. If multiple, concurrent sort operations are performed by user processes, physical memory can be quickly consumed, resulting in operating system virtual memory thrashing. Too small a value for the retained size parameter will result in additional I/O resource consumption as sort data is read.

(Sample recommendation) Process 330 has completed its evaluation of the sort_area_retained_size instance parameter. No changes are recommended for this parameter on the sample instance.
Relevant Data:
Sort area retained size setting: 262144 bytes
Sort area size: 262144 bytes
Multi-threaded server option: disabled
User Rule Settings:
Minimum sort area retained size: 0 bytes
Maximum sort area retained size: Unknown
SGA Parameter Evaluation Process 330 has evaluated the instance parameters which impact the amount of memory required for the SGA.
Buffer Cache Size The db_block_buffers parameter determines the number of database buffers available in the buffer cache. It is one of the primary parameters which contribute to the total memory requirements of the SGA on the instance. The db_block_buffers instance parameter, together with the db_block_size parameter, controls the total size of the buffer cache.

Effective use of the buffer cache can greatly reduce the I/O load on the database. Since db_block_size can only be specified when the database is first created, the buffer cache size is normally controlled using the db_block_buffers parameter.
Rule:

When the db_block_buffers parameter is too small, frequently accessed data will be flushed from the buffer cache too quickly, which forces the information to be re-fetched from disk. Since disk access is much slower than memory access, application performance will suffer. In addition, the extra burden imposed on the I/O subsystem could introduce a bottleneck at one or more devices. This would further degrade performance.

Too large a value for the db_block_buffers parameter can cause several types of problems within the database environment. If memory is available on the system, and the operating system is configured to support the specified number of database buffers, then the impact is that memory is wasted by the buffer cache that could be utilized elsewhere. If memory is available, but the operating system is not configured to support the specified number of buffers, then the database instance will not start. When memory is not available on the system, too large a value for db_block_buffers can lead to paging or swapping of the SGA. In cases of extreme memory shortage, the operating system will need to swap parts of itself as it juggles memory on behalf of the applications.

(Sample recommendation) Process 330 has completed its evaluation of the db_block_buffers instance parameter. No changes are recommended for this parameter on the sample instance.
Relevant Data:
Db block buffers setting: 500 buffers
Database block size: 2048 bytes
Total physical memory: Unknown
Available physical memory: 102.40 Mb
Total SGA size: 4841 Kb (4.62 percent)
Buffer cache size: 1000 Kb (0.95 percent)
Weighted buffer cache hit ratio: 100.00 percent (1 samples)
User Rule Settings:
Minimum number of buffers allowed: 50 buffers
Maximum SGA percent available memory: 90.00 percent
Minimum buffer cache percent of memory: 5.00 percent
Buffer cache hit ratio low: 70.00 percent
Buffer cache hit ratio high: 95.00 percent
Default total physical memory: 128 Mb
Available memory percentage: 80.00 percent
Minimum Reserved Pool Allocation The shared_pool_reserved_min_alloc instance parameter determines the threshold above which SQL requests are allowed to allocated memory from the shared pool reserved list. This parameter, along with the shared_pool_reserved_size parameter, is used to control the amount of shared pool space that is reserved for large contiguous requests for shared pool memory. Additional information on the relationship between these two parameters can be found in the shared_pool_reserved_size section of this report.

A proper setting for the reserved list minimum allocation threshold will ensure optimal utilization of the reserved list mechanism.
Rule:

When the reserved list minimum allocation threshold is set too low, contiguous space may not be available on the reserved list for larger allocation requests. This will cause pool fragmentation problems to persist. Too high a setting for the reserved list minimum allocation threshold will cause the instance to request fewer allocations from the reserved list than is optimal to minimize pool fragmentation. In extreme cases, it is possible that pool fragmentation could actually increase, since the size of the shared pool is effectively reduced by the amount of space set aside for the reserved list.

(Sample recommendation) Process 330 has completed its evaluation of the shared_pool_reserved_min_alloc instance parameter. No changes to this parameter are recommended for the sample instance at this time.
Relevant Data:
Shared pool reserved min alloc setting: 5000 bytes
Reserved list mechanism: disabled
Last shared pool alloc fail size: Unknown
Max pool segment size (history): Unknown Weighted avg pool segment size: Unknown
Stddev pool segment size: Unknown
Average reserved pool usage count: Unknown
Sample count: 1
User Rule Settings:
Minimum reserved allocation size: 5000 bytes
Stddev reserved size threshold: 2
Allocation failure percentage: 90.00 percent
Used count threshold: 0.30
Samples for statistical significance: 100 samples Shared Pool Size The shared_pool size instance parameter controls the total size of the shared pool. The shared pool contains the library cache of shared SQL requests, the dictionary cache, and other cache structures that are specific to a particular instance configuration.

For example, if the instance is configured as a multi-threaded server, session information and the private SQL area for each client process are included in the shared pool. If the instance is configured with the parallel query option, the shared pool contains the server message buffers. The shared pool is one of the components which contribute to the total size of the SGA.

The shared pool mechanism reduces system resource consumption in at least three ways: 1) Parse time is avoided if the SQL statement is already in the shared pool. This saves CPU resources; 2) Application memory overhead is reduced, since all applications utilize the same pool of shared SQL statements and dictionary resources; and 3) I/O resources are saved, since dictionary elements which are in the shared pool do not require disk access.

Rule:

When the shared pool is undersized, users will consume additional resources to complete a database operation. For library cache accesses, the overhead is primarily the additional CPU resources required to reparse the SQL statement. The impact to dictionary cache accesses is primarily I/O, since dictionary cache references that have been displaced from the cache will need to be refetched from disk. The impact of an undersized shared pool to user response times will vary depending on whether there is a pre-existing bottleneck on the resource charged for the overhead. An oversized shared pool results in a waste of memory resources which might be better utilized elsewhere in the database environment.

(Sample Recommendation) Process 330 has evaluated the shared_pool_size instance parameter. No changes to this parameter are recommended for the sample instance at this time.

Relevant Data:
Shared pool size setting: 3300000 bytes
Last shared pool alloc fail size: Unknown
Shared pool reserved min alloc: 5000 bytes
Total physical memory: Unknown
Available physical memory: 102.40 Mb
Total SGA size: 4841 Kb (4.62 percent)
Shared pool size: 3417.97 Kb (3.26 percent)
Weighted shared pool alloc hit ratio: Unknown
User Rule Settings:
Default total physical memory: 128 Mb
Minimum shared pool size threshold: 3 Mb
Maximum SGA percent available memory: 90.00 percent
Shared pool alloc hit ratio low: 99.70 percent
Shared pool alloc hit ratio high: 100.00 percent
Available memory percentage: 80.00 percent Reserved Pool Size The shared_pool_reserved_size instance parameter controls the amount of shared pool space which is reserved for large contiguous requests for shared pool memory. This parameter, along with the shared_pool_reserved_size_min_alloc instance parameter, can be used to avoid performance degradation in the shared pool from situations where pool fragmentation forces an RDBMS system to search and free chunks of unused pool to satisfy the current request.

Pool fragmentation problems have been greatly reduced in some RDBMS systems by minimizing the number of entities which require large allocations in the shared pool. PL/SQL now allocates segments of pool space instead of requiring one large, contiguous chunk. In addition, certain large, static pool allocations have been eliminated.

The shared_pool_reserved_size and the shared_pool_reserved_min_alloc instance parameters are used to set aside a portion of the shared pool for large contiguous allocation requests. In an optimal scenario, the shared pool is partitioned into two components based on allocation request size. The first partition will contain requests that are smaller than or equal to the min_alloc threshold, the second partition requests whose size is greater than the threshold.

Rule:

If the system is not busy, large allocation requests which are greater than the min_alloc threshold may initially find and allocate space from the shared pool's free list rather than allocating space from the reserved pool list. This will have the impact of reducing the size of the shared pool for requests whose size is smaller than the min_alloc threshold by the sum of the large requests that have been allocated from the shared pool. Too large a value for the shared pool_reserved_size parameter will waste shared pool space. Too small a value for the shared_pool reserved_size parameter will cause the reserve list mechanism to operate less effectively.

(Sample recommendation) Process 330 has completed its evaluation of the shared_pool_reserved_size instance parameter. No changes to the shared_pool_reserved_size parameter are recommended for the sample instance at this time.

Relevant Data:
Shared pool reserved size setting: 0 bytes
Reserved list mechanism: disabled
Shared pool reserved min alloc: 5000 bytes
Last shared pool alloc fail size: Unknown
Max pool segment size (last): Unknown
Max pool segment size (history): Unknown
Weighted avg pool segment size: Unknown
Stddev pool segment size: Unknown
Weighted avg reserved list hit ratio: Unknown
Reserved list last miss size: Unknown
Weighted avg reserved max free space: Unknown
Average reserved pool usage count: Unknown
Sample count: 1
User Rule Settings:
Segment size multiplier: 2.00
Minimum reserved allocation size: 5000 bytes
Stddev reserved size threshold: 2
Reserved list hit ratio low: 98.00 percent
Reserved list hit ratio high: 99.50 percent
Max free reserved list percent: 50.00 percent Reserved list decrement percentage: 2.00 percent
Used count threshold: 0.30
Samples for statistical significance: 100 samples Log Buffer Size The log_buffer instance parameter determines the amount of memory that is used when buffering redo entries to a redo log file. Redo log entries contain a record of the changes that have been made to the database block buffers. The log writer process writes redo log entries from the log buffer to a redo log file.

Rule:

The log buffer should be sized so that space is available in the log buffer for new entries, even when access to the redo log is heavy. When the log buffer is undersized, user processes will be delayed as they wait for the log writer to free space in the redo log buffer. Oversizing the log buffer wastes memory.

(Sample Recommendation) Process 330 recommends increasing the log_buffer instance parameter from:

16384 bytes→32768 bytes

The current value is below the threshold established as the recommended minimum for the size of a redo log buffer. Undersizing the redo log buffer will result in performance degradation while users wait for space in the redo log buffer to become available.

Relevant Data:

Log buffer setting: 16384 bytes User Rule Settings:

Minimum log buffer size: 32768 bytes Open Cursors

The open_cursors instance parameter controls the maximum number of concurrent cursors that may be open for a session. This parameter also constrains the size of the PL/SQL cursor cache which PL/SQL maintains to avoid reparsing when PL/SQL statements are re-executed by the user.

Rule:

If the open_cursors limit is too small, user processing will stop when the limit is reached. If PL/SQL is used, additional reparsing of statements may be necessary. Too large a limit for the open_cursors instance parameter will waste memory resources. (Sample recommendation) Process 330 recommends increasing the open_cursors instance parameter from:

50 cursors→64 cursors to make it a multiple of the cursor array batch size. An RDBMS system allocates the cursor array structure dynamically in batches of 64 elements. When the open cursor limit is not a multiple of the batch size, some memory is allocated for cursor structures that cannot be used by the session. Implementing this recommendation will avoid memory allocation for array elements which cannot be accessed by the session.

Relevant Data:

Current open_cursors setting: 50 cursors
an RDBMS system7 Server Release: 7.3.1.0.0
Avg concurrent sessions: 4.00 sessions (1 samples)

User Rule Settings:

Cursor batch size: 64 cursors
Cursor array element size: 30 bytes
Forms applications used: no
Cursor forms factor multiplier: 2 cursors I/O Parameter Evaluation Process 330 has evaluated the instance parameters which impact I/O resource consumption.

Multiblock Read Count

The db_file_multiblock_read_count instance parameter determines the maximum number of database blocks read in one I/O operation during a sequential table scan. The total number of I/Os required to perform a full table scan depends upon factors such as the size of the table, the multi-block read count, and whether parallel query is being utilized for the operation.

Rule:

If db_file_multiblock_read_count is set too low, additional I/O will be required to perform sequential table scans when the table does not qualify as a short table. The only real cost of setting db_file_multiblock_read_count too high is that the server will consume some additional memory. The upper bound on this parameter is determined by the multiblock read factor. The multiblock read factor is calculated by multiplying the db_block_size times the db_file_multiblock_read_count. Typical limits on the multiblock read factor are 64 Kb. If the underlying operating system where the server is running support an efficient scatter read, the buffers are read into the buffer cache. If not, a temporary buffer is allocated for the read, which may cause a slight increase to the memory requirements for the PGA or process stack. The PGA is used for the read if the parallel query option has been enabled.

(Sample recommendation) Process 330 has completed its evaluation of the db_file_multiblock_read_count instance parameter. No changes are recommended for this parameter on the sample instance.

Relevant Data:

Db file multiblock read count: 8 blocks

Database block size: 2048 bytes

Workload Class: oltp

Table scan row ratio: Unknown

User Rule Settings:

Minimum multiblock read count: 2 blocks

Minimum multiblock read buffer: 16 Kb

Maximum multiblock read buffer: 64 Kb

Table scan row threshold: 3.00 percent

Simultaneous Writes

The db_file_simultaneous_writes instance parameter determines the number of simultaneous writes to each database file when written. Environments which have database files that reside on RAM devices or which utilize disk striping at the operating system level will need to increase the simultaneous writes parameter to tell an RDBMS system about this increased capacity. This parameter is also used to determine the number of reads per file in the redo read ahead when reading redo during recovery. This parameter really impacts the number of simultaneous I/Os, not just the number of simultaneous writes.

Rule:

If this parameter is set too low, the DBWR process might not write dirty buffers fast enough, which can cause sessions to wait for free buffers. Too large a value for the db_file_simultaneous_writes parameter will cause extra memory to be used by the DBWR process. The extra memory is allocated in the master process.

(Sample recommendation) Process 330 has completed its evaluation of the db_file_simultaneous_writes instance parameter. No changes are recommended for this parameter on the sample instance.

Relevant Data:

Db file simultaneous writes: 4 batches

Avg (weighted) free buffer waits ratio: Unknown

OS support asynchronous writes: Unknown

Maximum stripe disks: 1

User Rule Settings:
  Free buffer waits ratio low: 99.90 percent
  Stripe factor: 4
  Peak logical write rate: medium (50 per second)
  Maximum simultaneous writes: 64 batches Checkpoint Process The checkpoint_process instance parameter determines whether or not the optional CKPT background process will be started to off load the LGWR process during checkpoint operations. The CKPT process updates the database headers of all data files when it is used. This can decrease the amount of time database users have to wait for a checkpoint operation to complete.

During a checkpoint, three operations take place. The DBWR process writes all modified database blocks in the buffer cache back to the database files, the LGWR process updates the database control file to indicate when the last checkpoint operation was performed, and the LGWR process updates the headers in all the database files. A separate process updates the headers when the checkpoint process instance parameter has been enabled.

Rule:

Unnecessarily enabling checkpoint processing will add overhead because the operating system must manage the checkpoint process. In the case where checkpoint processing has not been enabled but it is needed, users might notice performance degradation during checkpoint operations.

(Sample recommendation) Process 330 has completed its evaluation of the checkpoint_process instance parameter. No changes are recommended for this parameter on the sample instance.

Relevant Data:
  Checkpoint process setting: FALSE
  Number of datafiles: 10 files
User Rule Settings:
  Datafile threshold: 10 files Log Checkpoint Interval The log checkpoint interval instance parameter controls how often a checkpoint operation will be performed based upon the number of operating system blocks that have been written to the transaction log. If this parameter is larger than the size of the transaction log, then the checkpoint will occur when an RDBMS system performs a log switch from one group to another, when the time specified by log_checkpoint_timeout has expired, or when a checkpoint has been forced by the DBA.

Rule:

The LOG_CHECKPOINT_INTERVAL instance parameter influences when a checkpoint occurs. The checkpoint frequency is one of the factors which impacts the time required for the database to recover from an unexpected failure. Longer intervals between checkpoints mean that if the system crashes, more time will be needed for the database to recover. Shorter checkpoint intervals mean that the database will recover more quickly, at the expense of increased resource consumption during the checkpoint operation.

This parameter impacts the time required to complete a database recovery operation during the roll forward phase of recovery. The actual recovery time is dependent upon this time, and other factors, such as the type of failure (instance or system crash, media failure, etc.), and the number of archived transaction logs which need to be applied.

(Sample recommendation) Process 330 has completed its evaluation of the log_checkpoint_interval instance parameter. No changes are recommended for this parameter on the sample instance.

Relevant Data:
  Log checkpoint interval setting: 1000 os blocks
  Max txn log buffer size: 204800 bytes
  Operating system block size: Unknown
User Rule Settings:
  Unscheduled downtime tolerance: large
  Default os block size: 512 bytes Log Checkpoint Timeout The log_checkpoint timeout instance parameter controls how often a checkpoint will be performed based on the number of seconds that have passed since the last checkpoint.

Rule:

Checkpoint frequency impacts the time required for the database to recover from an unexpected failure. Longer intervals between checkpoints mean that more time will be required during database recovery.

Process 330 recommends using the LOG_CHECKPOINT_INTERVAL instance parameter to control the checkpoint interval rather than this parameter. The LOG_CHECKPOINT_TIMEOUT parameter will initiate a transfer every X seconds, regardless of the transaction frequency. This can cause unnecessary checkpoints in database environments where transaction volumes vary.

(Sample recommendation) Process 330 has completed its evaluation of the log_checkpoint_timeout instance parameter. No changes are recommended for this parameter on the sample instance.

Relevant Data:
  Log checkpoint timeout setting: 0 seconds
User Rule Settings:
  Minimum checkpoint timeout: 0 seconds Database Writers The db_writers instance parameter controls the number of database writer processes that are activated at instance startup. It is a platform specific parameter which is used to avoid database writer bottlenecks on operating systems which do not support asynchronous I/O. The DBWR process is responsible for writing dirty buffers in batches from the buffer cache back to the datafiles.

Database writer bottlenecks are most likely on systems which have a high insert, update, or delete rate and a large number of disk devices.

Rule:

Too many database writer processes can waste memory, since database writer slave processes will be created but not utilized. Too few database writer processes can cause sessions to wait for dirty buffers to be written to disk before a buffer becomes available.

(Sample recommendation) Process 330 has completed its evaluation of the db_writers instance parameter. No changes are recommended for this parameter on the sample instance.

Relevant Data:
  Db writers setting: 1 processes
  Avg (weighted) free buffer waits ratio: Unknown
  Avg (weighted) dirty buffer queue len: Unknown
  OS support asynchronous writes: Unknown
User Rule Settings:
  Free buffer waits ratio low: 99.90 percent
  Dirty buffer queue threshold: 0.70 buffers
  Peak logical write rate: medium (50 per second)
  Maximum db writers: 50 processes The embodiments of the present invention, a data driven, non-recursive computer implemented process for parameter evaluation within an information management system, is thus described. While the present invention has been described in particular embodiments, it should be appreciated that the present invention should not be construed as limited by such embodiments, but rather construed according to the below claims.

What is claimed is:

1. In a relational database management system having a processor coupled to a bus and a computer readable memory unit coupled to said bus, a method of performance tuning, said method comprising the steps of:

a) automatically generating a non-recursive parameter evaluation sequence from said computer readable memory unit, said non-recursive parameter evaluation sequence containing rules for evaluating a plurality of parameters which adjust resources within a database environment wherein parameter dependencies exist within parameters of said plurality of parameters, said step a) comprising the steps of:

removing circular dependencies within said plurality of parameters; and ordering said plurality of parameters into said non-recursive evaluation sequence by placing independent parameters first and placing dependent parameters following parameters on which said dependent parameters depend wherein parameters are placed higher in said non-recursive parameter evaluation sequence based on the number of parameters that are data dependent on said parameters;

b) evaluating said plurality of parameters using said non-recursive parameter evaluation sequence to determine a set of recommended values for said plurality of parameters, said step of evaluating performed in a single non-recursive evaluation path; and c) performance tuning said database environment by applying said set of recommended values to said plurality of parameters.

2. A method as described in claim 1 wherein said step a) further comprises the step of:

for a first set of parameters having no dependencies or equal dependencies, ordering parameters of said first set of parameters based on their impact on system performance and further based on their common data usage.

3. A method as described in claim 1 wherein said step b) comprises the step of evaluating individual rules that are associated with a respective parameter of said plurality of parameters in sequence according to data availability for said individual rules.

4. A method as described in claim 1 further comprises the step of accessing resource statistics and information regarding hardware resources pertinent to said database environment to be tuned and accessing current values for said plurality of parameters in advance of said step b).

5. A method as described in claim 1 further comprising the step of allowing a user to select a particular selected instance for performance tuning and identifying a plurality of parameters within said database environment pertinent to said selected instance.

6. A computer readable medium containing program instructions stored therein that implement a method of performance tuning when executed over a processor within in a relational database management system, said method comprising the steps of:

a) automatically generating a non-recursive parameter evaluation sequence from said computer readable memory unit, said non-recursive parameter evaluation sequence containing rules for evaluating a plurality of parameters which adjust resources within a database environment wherein parameter dependencies exist within parameters of said plurality of parameters, said step a) comprising the steps of:

removing circular dependencies within said plurality of parameters; and ordering said plurality of parameters into said non-recursive evaluation sequence by placing independent parameters first and placing dependent parameters following parameters on which said dependent parameters depend wherein parameters are placed higher in said non-recursive parameter evaluation sequence based on the number of parameters that are data dependent on said parameters;

b) evaluating said plurality of parameters using said non-recursive parameter evaluation sequence to determine a set of recommended values for said plurality of parameters, said step of evaluating performed in a single non-recursive evaluation path; and c) performance tuning said database environment by applying said set of recommended values to said plurality of parameters.

7. A computer readable medium as described in claim 6 wherein said step b) comprises the step of evaluating individual rules that are associated with a respective parameter of said plurality of parameters in sequence according to data availability for said individual rules.

8. A computer readable medium as described in claim 6 further comprises the step of accessing resource statistics and information regarding hardware resources pertinent to said database environment to be tuned and accessing current values for said plurality of parameters in advance of said step b).

9. A computer readable medium as described in claim 6 further comprising the step of allowing a user to select a particular selected instance for performance tuning and identifying a plurality of parameters within said database environment pertinent to said selected instance.

10. A method for evaluating parameters within a relational database management system comprising the steps of:

a) identifying a plurality of parameters to be tuned within said relational database management system wherein parameter dependencies exist within parameters of said plurality of parameters;

b) removing circular dependencies among said plurality of parameters;

c) automatically generating a non-recursive evaluation sequence by ordering said plurality of parameters according to the steps of:

c1) placing independent parameters first in said non-recursive evaluation sequence and placing dependent parameters following parameters on which said dependent parameters depend; and c2) placing parameters of said plurality of parameters higher in said non-recursive evaluation sequence based on the number of parameters that are data dependent on said parameters; and d) using a computer implemented process, evaluating said plurality of parameters using said non-recursive parameter evaluation sequence to determine a set of recommended values for said plurality of parameters.

11. A method as described in claim 10 further comprising the step of e) applying said set of recommended values to said plurality of parameters to tune said relational database management system.

12. A method as described in claim 11 wherein said step c) further comprises the step of, for a first set of parameters having no dependencies or equal dependencies, ordering parameters of said first set of parameters based on their impact on system performance and based on their common data usage.

13. A method as described in claim 12 wherein said step d) comprises the step of evaluating individual rules that are associated with a respective parameter of said plurality of parameters in sequence according to data availability for said individual rules.

14. A method as described in claim 12 further comprises the step of, in advance of said step d), accessing resource statistics and information regarding hardware resources pertinent to said relational database management system to be tuned and accessing current values for said plurality of parameters.

15. A method as described in claim 12 wherein said plurality of parameters are instance parameters.

16. A method as described in claim 15 wherein said step a) comprises the step of allowing a user to select a particular selected instance for tuning and identifying a plurality of parameters within said relational database management system pertinent to said selected instance.

17. A method as described in claim 12 wherein, with respect to a first parameter and a second parameter that are interdependent, said step b) comprises the step of breaking a circular dependency between said first parameter and said second parameter by inserting an intermediate attribute upon which said first parameter and said second parameter are dependent.

18. In a relational database management system having a processor coupled to a bus and a computer readable memory unit coupled to said bus, a method for tuning a database environment, said method comprising the steps of:

a) identifying a plurality of parameters within said database environment wherein parameter dependencies exist within parameters of said plurality of parameters;

b) removing circular dependencies within said plurality of parameters;

c) automatically generating a non-recursive evaluation sequence by ordering said plurality of parameters according to the steps of:

c1) placing independent parameters first in said non-recursive evaluation sequence and placing dependent parameters following parameters on which said dependent parameters depend; and c2) for a first set of parameters having no dependencies or equal dependencies, ordering parameters of said first set of parameters based on their impact on system performance and further based on their common data usage;

d) using a computer implemented process, evaluating said plurality of parameters using said non-recursive parameter evaluation sequence to determine a set of recommended values for said plurality of parameters; and e) tuning said database environment by applying said set of recommended values to said plurality of parameters.

19. A method as described in claim 18 wherein said step c1) comprises the step of placing parameters of said plurality of parameters higher in said non-recursive evaluation sequence based on the number of parameters that are data dependent on said parameters.

20. A method as described in claim 18 wherein said step d) comprises the step of evaluating individual rules that are associated with a respective parameter of said plurality of parameters in sequence according to data availability for said individual rules.

21. A method as described in claim 20 further comprises the step of accessing resource statistics and information regarding hardware resources pertinent to said database environment to be tuned and accessing current values for said plurality of parameters in advance of said step d).

22. A method as described in claim 18 wherein said plurality of parameters are instance parameters.

23. A method as described in claim 22 wherein said step a) comprises the step of allowing a user to select a particular selected instance for tuning and identifying a plurality of parameters within said database environment pertinent to said selected instance.

24. A method as described in claim 18 wherein, with respect to a first parameter and a second parameter that are interdependent, said step b) comprises the step of breaking a circular dependency between said first parameter and said second parameter by inserting an intermediate attribute upon which said first parameter and said second parameter are dependent.

* * * * *